United States Patent
Tanaka et al.

(10) Patent No.: US 9,454,197 B2
(45) Date of Patent: Sep. 27, 2016

(54) CONTROLLER AND SEMICONDUCTOR SYSTEM

(75) Inventors: Atsushi Tanaka, Itami (JP); Hiroshi Murakami, Itami (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 375 days.

(21) Appl. No.: 13/982,385

(22) PCT Filed: Jan. 28, 2011

(86) PCT No.: PCT/JP2011/051814
§ 371 (c)(1),
(2), (4) Date: Jul. 29, 2013

(87) PCT Pub. No.: WO2012/101822
PCT Pub. Date: Aug. 2, 2012

(65) Prior Publication Data
US 2013/0305065 A1 Nov. 14, 2013

(51) Int. Cl.
*G06F 1/32* (2006.01)
*G06F 1/26* (2006.01)
*G06F 1/00* (2006.01)
*H02M 3/155* (2006.01)
*H02M 3/157* (2006.01)

(52) U.S. Cl.
CPC ............... *G06F 1/26* (2013.01); *H02M 3/155* (2013.01); *G06F 1/32* (2013.01); *H02M 3/157* (2013.01)

(58) Field of Classification Search
CPC .................................... G06F 1/32; G06F 1/26
See application file for complete search history.

(56) References Cited

U.S. PATENT DOCUMENTS

| 5,528,125 | A | * | 6/1996 | Marshall | H02M 3/1582 323/222 |
| 2002/0071300 | A1 | * | 6/2002 | Jang | H02J 7/345 363/125 |
| 2003/0121916 | A1 | | 7/2003 | Ishihara | |
| 2003/0212916 | A1 | | 11/2003 | Ito et al. | |

(Continued)

FOREIGN PATENT DOCUMENTS

| JP | 11-113252 A | 4/1999 |
| JP | 2003-330549 A | 11/2003 |

(Continued)

OTHER PUBLICATIONS

Notice of Grounds of Rejection issued in Japanese Application No. 2012-554598 dated Jul. 29, 2014, w/English translation.

(Continued)

*Primary Examiner* — Phil Nguyen
(74) *Attorney, Agent, or Firm* — McDermott Will & Emery LLP

(57) ABSTRACT

A controller is formed as one chip, and controls a voltage regulator that supplies a power supply voltage to a CPU. The controller includes: an input unit for receiving a monitor voltage for monitoring the power supply voltage applied to the CPU; a control unit for detecting that the power supply voltage is decreased to a target voltage by the monitor voltage with the voltage regulator being in OFF state in a discharge mode; and an output unit for outputting a result signal indicating to make transition to a normal mode, when the power supply voltage has reached the target voltage. The control unit includes a calculation circuit, which is operated in accordance with a program. The calculation circuit is provided between the input unit and the output unit.

4 Claims, 22 Drawing Sheets

(56) References Cited

U.S. PATENT DOCUMENTS

| | | | |
|---|---|---|---|
| 2005/0240814 A1 | 10/2005 | Sasakura et al. | |
| 2006/0013020 A1* | 1/2006 | Aso | H02M 1/34 363/21.01 |
| 2007/0296388 A1* | 12/2007 | Sasaki | G05F 1/56 323/288 |
| 2008/0036424 A1* | 2/2008 | Saigo | H01M 10/441 320/136 |
| 2008/0189461 A1* | 8/2008 | Kim | G06F 1/30 710/261 |
| 2008/0219073 A1* | 9/2008 | Kang | G11C 11/4091 365/210.12 |
| 2009/0072790 A1* | 3/2009 | Ibrahim | H02J 7/0031 320/134 |
| 2009/0256537 A1 | 10/2009 | Sato et al. | |
| 2010/0045236 A1* | 2/2010 | Muraoka | H01M 10/0525 320/118 |
| 2010/0277092 A1* | 11/2010 | Menegazzi | H05B 33/0812 315/291 |
| 2011/0175577 A1* | 7/2011 | Kitanaka | H02J 7/0021 320/163 |
| 2013/0234446 A1* | 9/2013 | Kishibata | G05B 19/00 290/38 R |

FOREIGN PATENT DOCUMENTS

| | | |
|---|---|---|
| JP | 2005-116861 A | 4/2005 |
| JP | 2005-301476 A | 10/2005 |
| JP | 2006-048304 A | 2/2006 |
| JP | 2007-282404 A | 10/2007 |
| JP | 2008-011645 A | 1/2008 |
| JP | 2008-11655 A | 1/2008 |
| JP | 2008-017625 A | 1/2008 |
| JP | 2008-97382 A | 4/2008 |
| JP | 2010-268239 A | 11/2010 |

OTHER PUBLICATIONS

International Search Report in PCT/JP2011/051814 dated Apr. 26, 2011 with English Translation.

Japanese Office Action issued in Japanese Application No. 2012-554598 dated Mar. 10, 2015, with English Translation.

Japanese Office Action issued in Japanese Application No. 2015-064364, mailed Feb. 23, 2016, with English Translation.

* cited by examiner

|  | TABLE 0 | TABLE 1 | TABLE 2 | TABLE 3 |
|---|---|---|---|---|
| PERMISSIBLE MAXIMUM VOLTAGE VALUE | V0(v) | V1(v) | V2(v) | V3(v) |
| PERMISSIBLE MAXIMUM TEMPERATURE | T0(°C) | T1(°C) | T2(°C) | T3(°C) |
| PERMISSIBLE MAXIMUM CURRENT VALUE | I0(A) | I1(A) | I2(A) | I3(A) |
| . . . | . . . | . . . | . . . | . . . |

CONTROLLER AND SEMICONDUCTOR SYSTEM

This application is the U.S. National Phase under 35 U.S.C. §371 of International Application No. PCT/JP2011/051814, filed on Jan. 28, 2011, the disclosure of which Application is incorporated by reference herein.

TECHNICAL FIELD

The present invention relates to a controller and a semiconductor system, in particular, a controller for controlling a power supply for a semiconductor device such as a CPU (Central Processing Unit), as well as a semiconductor system.

BACKGROUND ART

Each of Patent Document 1 (Japanese Patent Laying-Open No. 11-113252) and Patent Document 2 (Japanese Patent Laying-Open No. 2007-282404) illustrates an operation in which a calculation device employing a parameter and a program is used to control a switching transistor to be turned on/off so as to maintain power supply voltage, which is supplied to a semiconductor device such as a CPU, at constant, for example.

CITATION LIST

Patent Document

PTD 1: Japanese Patent Laying-Open No. 11-113252
PTD 2: Japanese Patent Laying-Open No. 2007-282404

SUMMARY OF INVENTION

Technical Problem

Each of Patent Document 1 and Patent Document 2 mainly describes the operation in which the power supply voltage supplied to the semiconductor device is maintained at constant by the calculation unit using the program and the parameter. In other words, it is disclosed that in the case where a DSP (Digital Signal Processor) or an MCU (Micro Control Unit) is used, the power supply voltage supplied to the semiconductor device is maintained at constant by turning on and off the switching transistor.

Accordingly, the present invention has its object to provide a controller and a semiconductor system, by each of which a semiconductor device can be effectively and appropriately operated using a DSP or an MCU.

Solution to Problem

A controller in one embodiment of the present invention controls a voltage regulator that supplies a power supply voltage to a first semiconductor device.

This controller includes: an input unit for receiving a monitor voltage for monitoring the power supply voltage supplied to the first semiconductor device; a control unit for detecting that the power supply voltage is decreased to a target voltage by the monitor voltage in a discharge mode in which the power supply voltage of the first semiconductor device is decreased with the voltage regulator being in OFF state; an output unit for outputting a signal indicating that the target voltage has been reached, when the power supply voltage reaches the target voltage from a starting voltage obtained upon start of the discharge mode; and a calculation circuit, which is operated in accordance with a program. The signal indicating that the target voltage has been reached is generated using the calculation circuit.

Advantageous Effects of Invention

According to the embodiment of the present invention, the power supply voltage supplied to the semiconductor device can be effectively and appropriately controlled using a DSP or an MCU.

DESCRIPTION OF EMBODIMENTS

Figure 1:
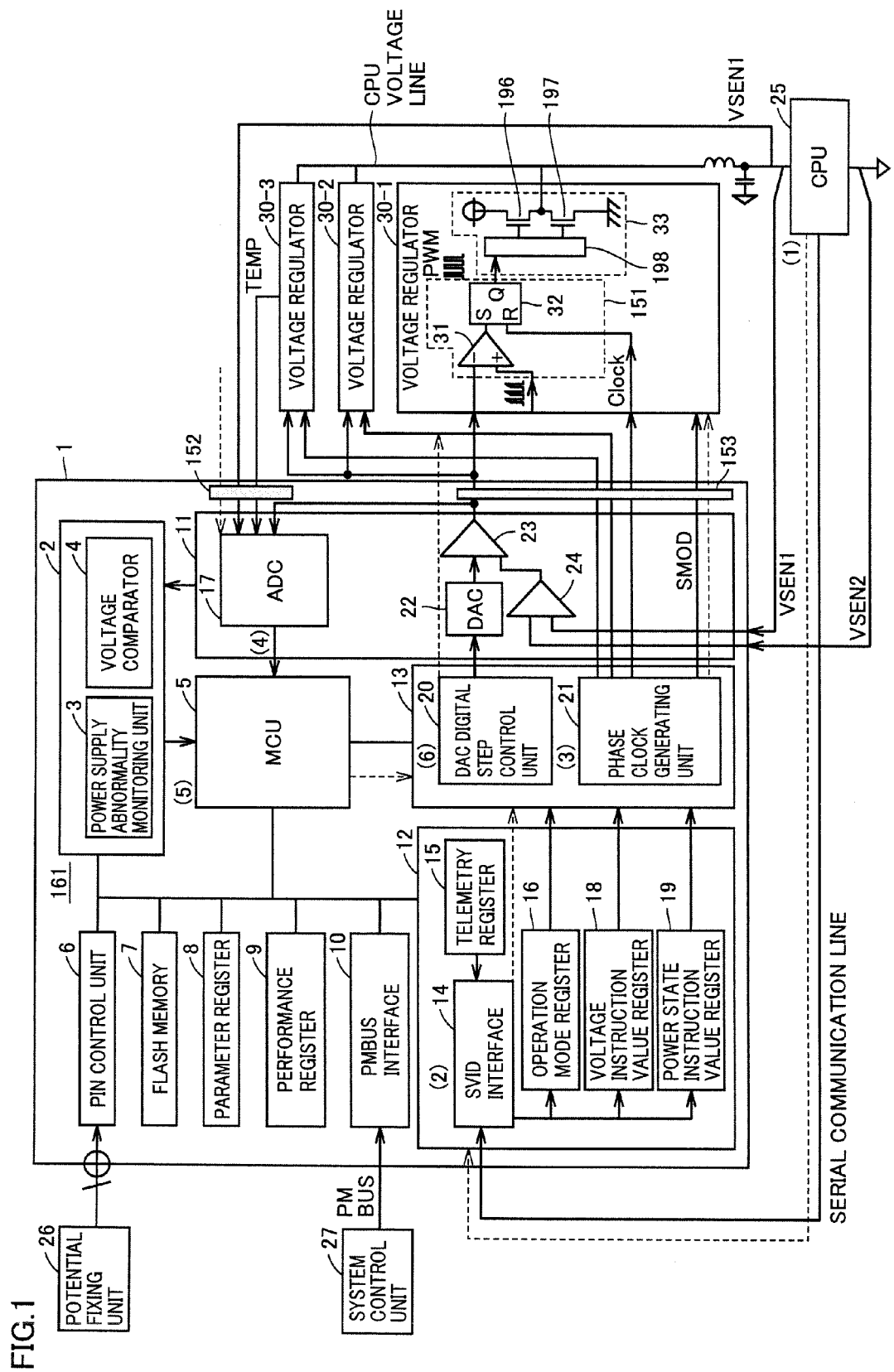
FIG. 1 shows a configuration of a semiconductor system of an embodiment of the present invention.

The following describes embodiments of the present invention with reference to figures.
[First Embodiment]
(Configuration of Semiconductor System)
FIG. 1 shows a configuration of a semiconductor system of an embodiment of the present invention.

Referring to FIG. 1, this semiconductor system includes a controller 1, voltage regulators 30-1 to 30-3, and a CPU 25 serving as a first semiconductor device.

Here, controller 1 is formed as one chip (one semiconductor chip).

Controller 1 includes a PIN control unit 6, a flash memory 7, a parameter register 8, a performance register 9, an MCU 5, a PMBUS (Power Management Bus) interface 10, an SVID (Serial VID) command determining circuit 12, a hard logic power supply control circuit 13, an analog power supply control circuit 11, a power supply abnormality monitoring circuit 2, an input unit 152, and an output unit 153.

Of the components of controller 1, MCU 5, hard logic power supply control circuit 13, analog power supply control circuit 11, and power supply abnormality monitoring circuit 2 constitute a control unit 161.

SVID command determining circuit 12 includes an SVID interface 14, an operation mode register 16, a voltage instruction value register 18, a power state instruction value register 19, and a telemetry register 15.

Input unit 152 receives an output voltage from voltage regulator(s) 30-1 to 30-3.

In other words, input unit 152 receives a monitor voltage for monitoring a power supply voltage supplied to the CPU.

Output unit 153 outputs a signal from controller 1 to voltage regulator(s) 30-1 to 30-3.

Here, CPU 25 is formed as one chip, receives the power supply voltage output from voltage regulator(s) 30-1 to 30-3, and performs various processes. Further, CPU 25 sends an instruction to controller 1 via SVID interface 14.

PIN control unit 6 sends setting information to MCU 5. The setting information indicates how an external terminal is set in accordance with the terminal's potential fixed by an external potential fixing unit 26.

In flash memory 7, a program for causing MCU 5 to perform a process is stored. The use of program dispenses with time and effort in redeveloping the device even when a standard of power supply is changed. Further, flash memory 7 stores a table of a plurality of parameters that define initial values for permissible maximum voltage value, permissible maximum temperature, permissible maximum current, and the like.

Through SVID interface 14, the following parameters are stored in parameter register 8: an amount of change in voltage value in each step during digital step control (voltage in each step); a value of ΔV, which is a difference between an instruction voltage and a target voltage Vs; and the like. The instruction voltage is a final voltage to which the voltage is instructed to be decreased in a discharge mode. Target voltage Vs is employed to end the discharge mode before the voltage reaches the instruction voltage.

Performance register 9 receives and stores data of the permissible maximum voltage value, the permissible maximum temperature, the permissible maximum current, and the like, each of which is stored in flash memory 7.

Here, the permissible maximum voltage value refers to the maximum power supply voltage that can be applied to the CPU. The permissible maximum temperature, which is measured from a voltage regulator or the like, refers to the maximum temperature permissible for the operation. The permissible maximum current refers to the maximum current that can be flown by the voltage regulator.

When these values are exceeded, the controller sends an instruction signal to the voltage regulator or the like so as to decrease the values.

MCU 5 performs a calculation process based on a program.

PMBUS interface 10 receives a signal from an external system control unit 27 and sends a signal to external system control unit 27 via a PMBUS.

SVID interface 14 receives a signal from CPU 25 and sends a signal to CPU 25 via a serial communication line.

Operation mode register 16 stores an operation mode at present. Examples of the operation mode include a normal mode, a discharge mode, and the like.

Voltage instruction value register 18 stores a value of instruction voltage during voltage control.

Power state instruction value register 19 stores a designated value for a power state mode during power state control.

Telemetry register 15 stores: a digital voltage value DV indicating an output voltage of voltage regulator(s) 30-1 to 30-3; a digital voltage value DT indicating a temperature in voltage regulator(s) 30-1 to 30-3; and a digital voltage value DI indicating a value of current supplied to voltage regulator(s) 30-1 to 30-3.

Hard logic power supply control circuit 13 includes a DAC digital step control unit 20 and a phase clock generating unit 21.

DAC digital step control unit 20 determines a voltage change value in each step such that the voltage will reach the instructed voltage in a plurality of steps, and outputs the determined voltage change value as digital voltage DV.

Phase clock generating unit 21 activates control signal SMOD for voltage regulator(s) 30-1 to 30-3 to be operated, and outputs a phase clock to voltage regulator(s) 30-1 to 30-3 to be operated. Phase clock generating unit 21 deactivates control signal SMOD for voltage regulator(s) 30-1 to 30-3 to be stopped.

Analog power supply control circuit 11 includes a DAC (Digital Analog Converter) 22, a differential amplifier 24, an error amplifier 23, and an ADC (Analog Digital Converter) 17.

DAC 22 converts digital voltage DV, which is output from DAC digital step control unit 20, into an analog voltage V1.

Differential amplifier 24 amplifies a difference between a voltage VSEN1 at the high-potential side of CPU 25 and a voltage VSEN2 at the low-potential side of CPU 25, and outputs a voltage V2.

Error amplifier 23 amplifies a difference between voltage V1 output from DAC 22 and voltage V2 output from differential amplifier 24, and outputs the amplified voltage to voltage regulator(s) 30-1 to 30-3 as a voltage indicating a difference between the designated voltage and the voltage of CPU 25 at present.

ADC 17 performs AD conversion of the output voltage of voltage regulator(s) 30-1 to 30-3 or the like.

Power supply abnormality monitoring circuit 2 includes a voltage comparator 4 and a power supply abnormality monitoring unit 3.

Voltage comparator 4 receives an analog signal, which indicates a voltage value, from input unit 152, and compares it with a predetermined reference voltage by means of an analog process.

In accordance with an output of voltage comparator 4, power supply abnormality monitoring unit 3 monitors whether or not the power supply voltage of CPU 25 is abnormal.

Voltage regulator(s) 30-1 to 30-3 supply CPU 25 with the power supply voltage.

It is assumed herein that each of voltage regulators 30-1 to 30-3 is contained in one package.

Moreover, it is assumed herein that in the package, each of voltage regulators 30-1 to 30-3 is formed of the following three chips: a high-side MOS transistor 196; a low-side MOS transistor 197; and the other portion (a PWM (Pulse Width Modulation) unit 151 and a MOS control unit 198)).

Each of voltage regulators 30-1 to 30-3 includes PWM unit 151 and a DC-DC converter 33. When control signal SMOD is activated, voltage regulator(s) 30-1 to 30-3 are operated, whereas when control signal SMOD is deactivated, voltage regulator(s) 30-1 to 30-3 are stopped to be operated.

PWM unit 151 includes a PWM comparator 31 and a latch circuit 32.

PWM comparator 31 outputs a PWM signal based on an error signal, which is output from error amplifier 23.

Latch circuit 32 has a set terminal S via which the output of PWM comparator 31 is received. Latch circuit 32 has a reset terminal R via which a clock, i.e., an output of phase clock generating unit 21 is received.

DC-DC converter 33 is connected to the output of latch circuit 32, and supplies the power supply voltage to CPU 25.

Here, in accordance with the PWM signal output from latch circuit 32, DC-DC converter 33 is controlled.

When high-side MOS transistor 196 shown in FIG. 1 is turned on and low-side MOS transistor 197 is turned off, voltage VSEN1 is increased in a CPU voltage line at the high-potential side of CPU 25.

On the other hand, when high-side MOS transistor 196 is turned off and low-side MOS transistor 197 is turned on, voltage VSEN1 is decreased in the CPU voltage line.

In the normal mode, high-side MOS transistor 196 and low-side MOS transistor 197 are controlled to be on/off such that voltage VSEN1 in the CPU voltage line becomes a constant voltage.

Namely, when the voltage is low, high-side MOS transistor 196 is turned on (and low-side MOS transistor 197 is turned off on this occasion) to increase the voltage. On the other hand, when the voltage is high, low-side MOS transistor 197 is turned on (and high-side MOS transistor 196 is turned off on this occasion) to decrease the voltage.

(Discharge Mode)

The discharge mode is a mode in which voltage VSEN1 in the CPU voltage line is decreased to a specific voltage by discharging of electric charges in the CPU and the like with DC-DC converter 33 being maintained in OFF state.

The discharge mode is not such that high-side MOS transistor 196 is turned on (and low-side MOS transistor 197 is turned off on this occasion) to increase the voltage when the voltage is low and low-side MOS transistor 197 is turned on (and high-side MOS transistor 196 is turned off on this occasion) to decrease the voltage when the voltage is high in order to attain the constant voltage. In other words, in the discharge mode, control is not performed to attain the constant voltage by turning on and off DC-DC converter 33.

It should be noted that DC-DC converter 33 may be brought into OFF state by bringing voltage regulator 30 into OFF state. DC-DC converter 33 may be brought into OFF state.

Generally, in the discharge mode, a high-speed process is not required.

Figure 2:
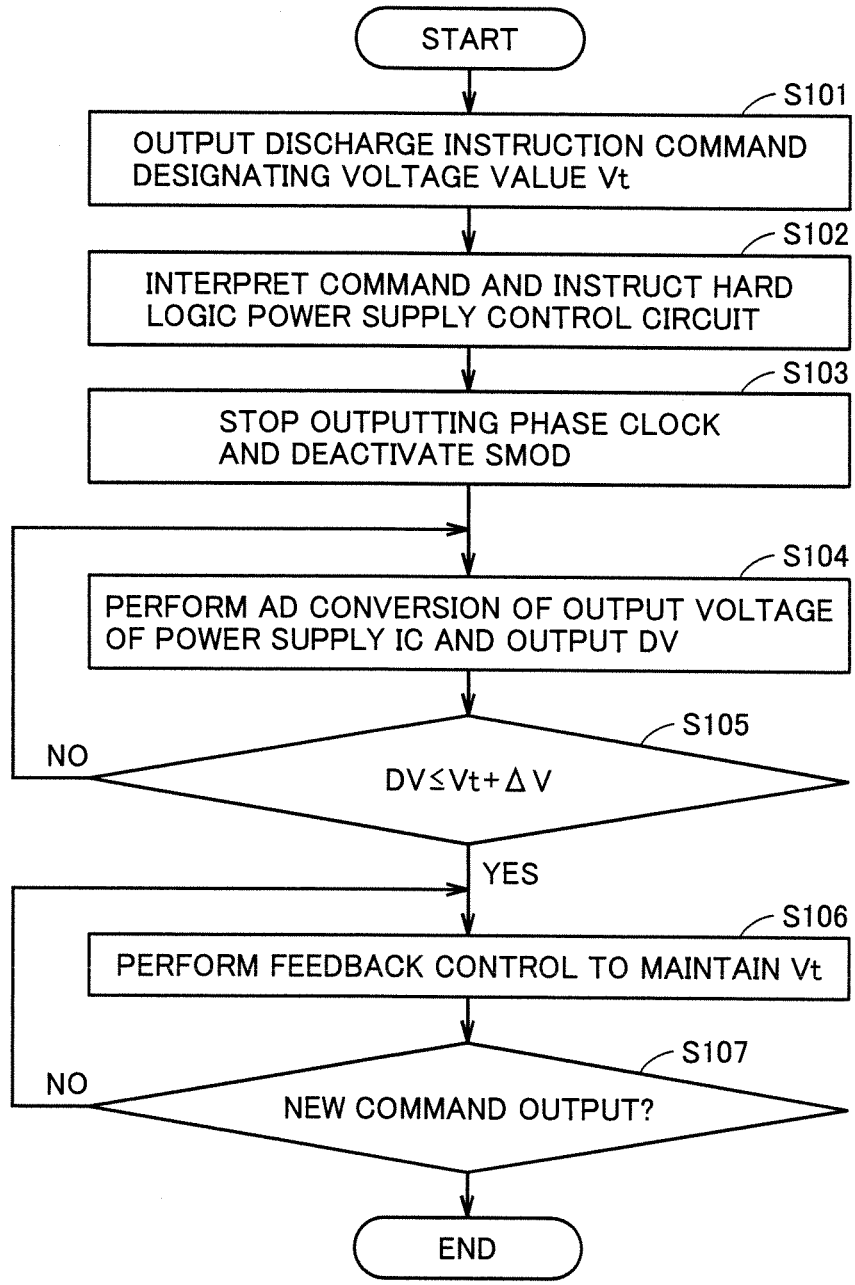
FIG. 2 is a flowchart showing a procedure of a discharge process.

FIG. 2 is a flowchart showing a procedure of the discharge process.

Figure 3:
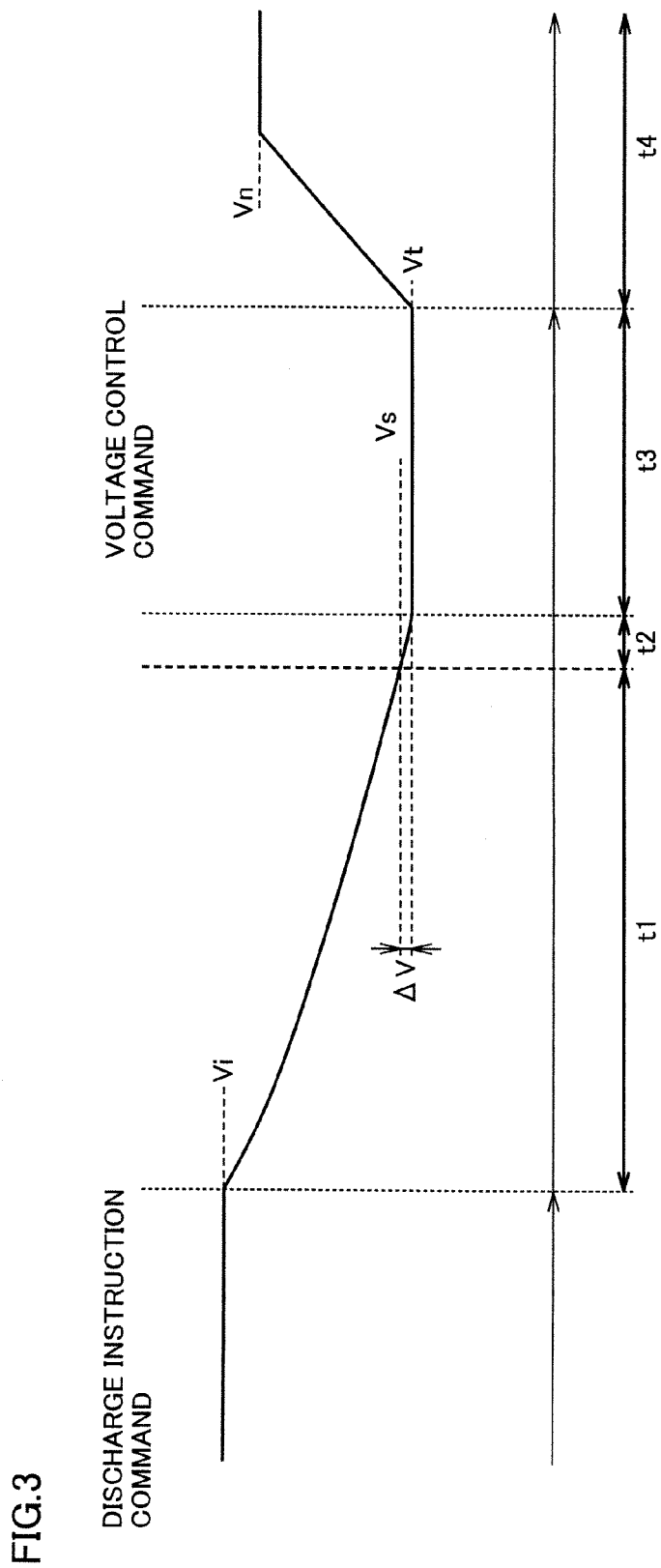
FIG. 3 shows a change in voltage of a CPU during the discharge process.

FIG. 3 shows a change in voltage of CPU 25 during the discharge process. The vertical axis represents voltage VSEN1 of the CPU voltage line shown in FIG. 1, whereas the horizontal axis represents time.

Referring to FIG. 1, FIG. 2, and FIG. 3, CPU 25 outputs a discharge instruction command, which designates a voltage value Vt, to the serial communication line (step S101; as indicated by (1) in FIG. 1).

SVID interface 14 receives and interprets the command sent via the serial communication line, and provides an instruction to MCU 5 (step S102; as indicated by (2) in FIG. 1).

MCU 5 sets the mode to the discharge mode, and instructs phase clock generating unit 21 to stop outputting the phase clock and deactivate control signal SMOD. Control signal SMOD thus deactivated is received by voltage regulator(s) 30-1 to 30-3, and voltage regulator(s) 30-1 to 30-3 stop the operation of increasing the voltage in response to decrease of the voltage in the CPU voltage line (step S103; as indicated by (3) in FIG. 1).

Because voltage regulator(s) 30-1 to 30-3 are brought into OFF state, the operation of decreasing the voltage in the CPU voltage line with low-side MOS transistor 197 being in ON state is stopped (corresponding to t1 in FIG. 3).

ADC 17 performs AD conversion of the output voltage of voltage regulator(s) 30-1 to 30-3, and sends digital voltage value DV to MCU 5 (step S104; as indicated by (4) in FIG. 1).

Next, MCU 5 compares digital voltage value DV with a target voltage Vs, which is higher than instruction voltage Vt by ΔV (n times as large as the voltage change amount in one step in the voltage control during the normal mode as described below). When digital voltage value DV reaches or falls below target voltage Vs higher than instruction voltage Vt by ΔV (YES in step S105), MCU 5 ends the discharge mode (corresponding to t2 in FIG. 3).

Here, target voltage Vs is provided in addition to instruction voltage Vt due to the following reason. That is, if the discharge mode is ended after the voltage reaches instruction voltage Vt, the voltage will be highly likely to be further decreased during a time interval between the instruction of ending the discharge mode and the next operation.

To address this, by ending the discharge mode based on the voltage having reached target voltage Vs slightly higher than instruction voltage Vt, the voltage will be able to reach instruction voltage Vt at the start of the next operation.

MCU 5 makes transition to an instruction voltage maintaining mode (one type of the normal mode), and therefore outputs an instruction signal to hard logic control circuit 13 (as indicated by (5) in FIG. 1).

In the instruction voltage maintaining mode, feedback control is performed in the same procedure as that for the below-described voltage control in the normal mode such that the output voltage of voltage regulator(s) 30-1 to 30-3 corresponds to instruction voltage Vt (as indicated by (6) in FIG. 1 and corresponding to t3 in FIG. 3).

Specifically, a signal indicating that the target voltage has been reached is sent from output unit 153 to voltage regulator 30, and then feedback control is performed.

Until a command is newly input to change the voltage (step S 107), control is repeated to maintain the instruction voltage of step S 106.

The above-described ΔV is n times (n is an integer) as large as the voltage change amount in one step in the below-described voltage control during the normal mode, and is stored in parameter register 8. CPU 25 can change the value of voltage Vs by changing the value of ΔV.

Voltage regulator(s) 30-1 to 30-3 do not newly supply electric charges to CPU 25 after the input of the discharge instruction command. Accordingly, the voltage of CPU 25 is decreased from starting voltage Vi at a slow rate. This corresponds to t1 in FIG. 3.

When the voltage reaches target voltage Vs higher than instruction voltage Vt by ΔV, CPU 25 is supplied with the power supply voltage in accordance with the feedback control illustrated in the third embodiment such that the voltage reaches and is maintained at instruction voltage Vt. This corresponds to t2 and t3 in FIG. 3.

Thereafter, when a new voltage control command is input, CPU 25 is supplied with the power supply voltage in accordance with the feedback control illustrated in the third embodiment such that the voltage reaches the newly instructed voltage such as Vn in FIG. 3. This corresponds to t4 in FIG. 3.

When a difference between starting voltage Vi and target voltage Vs in the discharge mode is equal to a difference between the starting voltage and the instruction voltage in the normal mode, it takes a shorter time to reach the instruction voltage in the normal mode than a time taken to reach target voltage Vs in the discharge mode.

Meanwhile, a process that employs MCU 5 or the like, which performs a calculation process using a program, generally tends to be slower than a process in which the processing function is implemented using only a logical circuit.

However, for a mode, such as the discharge mode, that does not require relatively high-speed processing, it is suitable to perform the process using MCU 5 that performs a calculation process using a program.

It should be noted that when an MCU having a high processing speed is employed, not only the process for the discharge mode but also the process for the normal mode may be performed using MCU 5.

Further, in the case where a calculation process is performed using a program, processing characteristics in the discharge mode can be readily changed by changing the program and parameter.

For example, target voltage Vs can be readily changed depending on a system in the case where the rate of voltage decrease in t1 shown in FIG. 3 differs due to characteristics of the entire system.

In other words, target voltage Vs in the case where the rate of voltage decrease is faster may be set at a value higher than the value, which is higher than designated voltage Vt, set for target voltage Vs in the case where the rate of voltage decrease is slower.

Accordingly, the voltage can be avoided from being decreased to fall below designated voltage Vt during switching from the discharge mode to the normal mode (t2 in FIG. 3).

It should be noted that the difference between target voltage Vs and designated voltage Vt is desirably smaller than the difference between starting voltage Vi and target voltage Vs.

This is due to the following reason. That is, if the difference between target voltage Vs and designated voltage Vt is larger than the difference between starting voltage Vi and target voltage Vs, it takes a shorter time to reach target voltage Vs from starting voltage Vi. Accordingly, high-speed control is required.

Further, the target voltage may be changed by, for example, feeding a signal via the external terminal of controller 1 (portion indicated by "o" and connected to potential fixing unit 26 in FIG. 1) so as to write a target voltage in flash memory 7.

In another example, voltage VSEN1 in the CPU voltage line is indicated by a function f, such as VSEN1=f(Ar, Bi).

Here, Ar represents a parameter concerned with a resistance of a measurement system, and Bi represents a parameter concerned with a current of the measurement system. Ar and Bi are stored in flash memory 7 as parameters. MCU 5 uses the parameters during its operation.

Hence, by changing Ar and Bi thus stored in flash memory 7, parameter or coefficient for the function of VSEN1 can be changed.

Further, when function f is changed to another function g (Ar, Bi, C) (here, C represents a constant, for example) or the like, the program is changed together with the parameter or without changing the parameter. The changed program may be stored in flash memory 7, and may be used in the calculation circuit.

If the discharge mode is implemented by a configuration that does not employ calculation using a program unlike this embodiment, a change in function requires redesigning the chip to greatly change the logical circuit.

As described above, it is very effective to employ a calculation circuit that employs a program, in the case where the function is greatly changed or the like.

Further, controller 1 and voltage regulator(s) 30 are formed of different chips.

The chip of controller 1 and the chips constructing voltage regulator(s) 30 may be combined in various manners. Accordingly, a resulting function is also highly likely to differ depending on a combination of the chips.

Thus, it can be said that the use of the calculation process that employs the program to facilitate the change of the function is desirable to secure a stable operation.

It should be noted that the calculation device, which is operated in accordance with a program, such as MCU 5 desirably does not perform any other processes in the discharge mode.

This is due to the following reason. That is, when the voltage reaches target voltage Vs while the calculation device is dealing with a different process, a subsequent process will be delayed.

[Second Embodiment]

In a second embodiment, a telemetry operation will be described. The telemetry operation refers to an operation of regularly examining state information such as a voltage condition of CPU 25, and resulting data is retained in the controller. Further, the CPU can extract the data from the controller.

Generally, the telemetry operation is not required to be performed in high speed. Examples of the state information include voltage, current, temperature, and the like.

Figure 4:
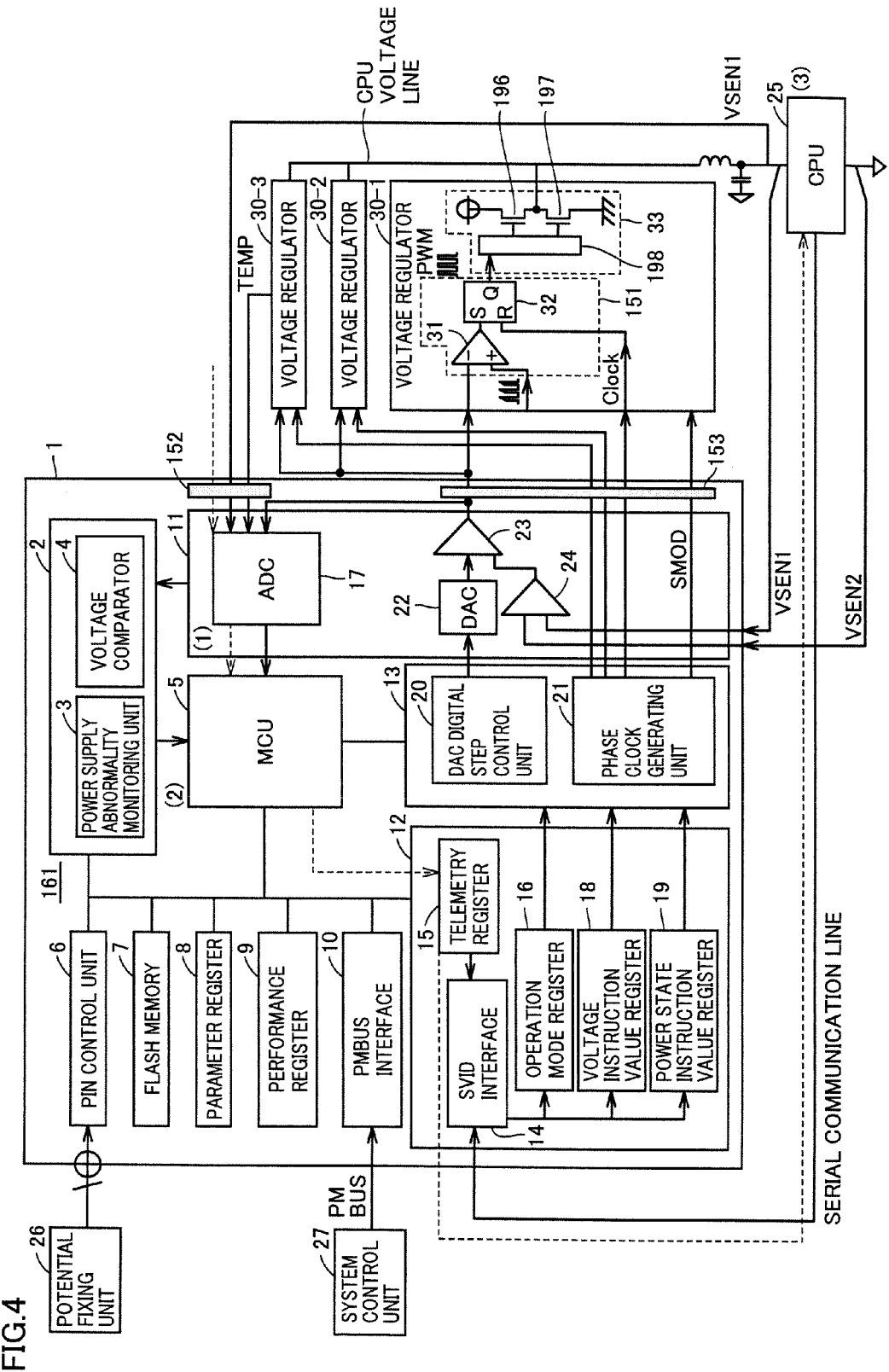
FIG. 4 shows a flow of control during a telemetry operation.

FIG. 4 shows a flow of control during the telemetry operation.

Figure 5:
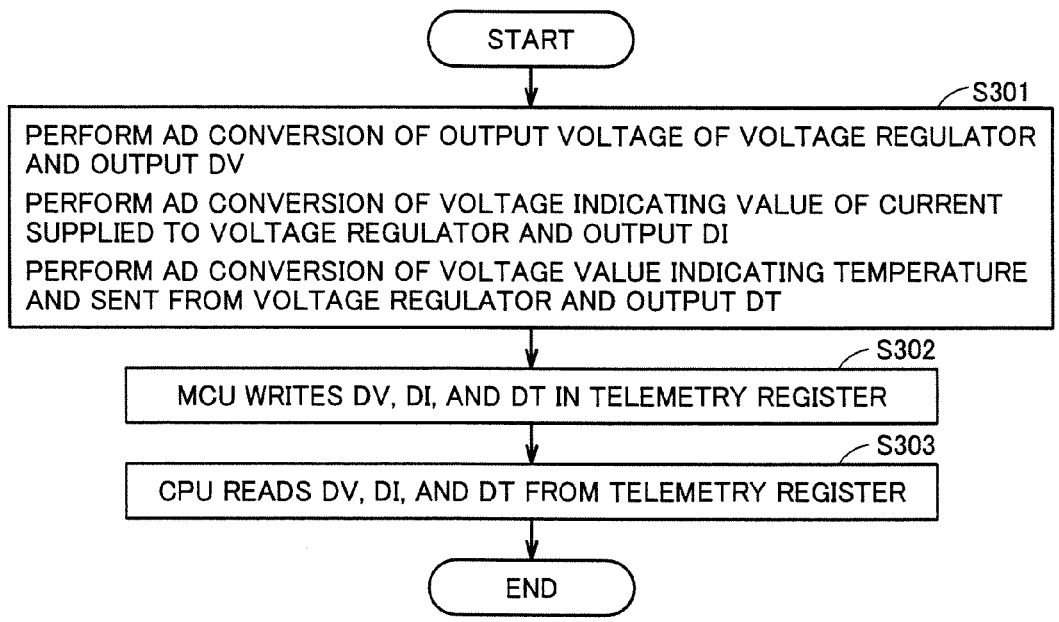
FIG. 5 is a flowchart showing a procedure of process of the telemetry operation.

FIG. 5 is a flowchart showing a procedure of process of the telemetry operation.

Referring to FIG. 4 and FIG. 5, ADC 17 receives a signal from input unit 152 at a first timing in μsec order, performs AD conversion of the output voltage of voltage regulator(s) 30-1 to 30-3, and sends a digital voltage value DV to MCU 5.

Further, ADC 17 receives a signal from input unit 152 at a second timing in μsec order, performs AD conversion of a voltage value (sent from error amplifier 23) indicating a value of current supplied to voltage regulator(s) 30-1 to 30-3, and sends digital voltage value DI' to MCU 5.

Further, ADC 17 receives a signal from input unit 152 at a third timing in μsec order, performs AD conversion of a voltage value indicating a temperature and sent from a temperature chip in voltage regulator(s) 30-1 to 30-3, and sends digital voltage value DT to MCU 5 (step S301; as indicated by (1) in FIG. 4).

Next, MCU 5 updates digital voltage value DV, stored in telemetry register 15, to the latest one received from ADC 17.

MCU 5 updates digital temperature value DT to digital voltage value DT' received from ADC 17, thereby updating digital temperature value DT stored in telemetry register 15 to the latest one.

MCU 5 updates digital current value DI to digital voltage value DI' received from ADC 17, thereby updating digital current value DI stored in telemetry register 15 to the latest one (step S302; as indicated by (2) in FIG. 4).

Next, CPU 25 reads out digital voltage value DV, digital current value DI, and/or digital temperature value DT from telemetry register 15 as required (step S303; as indicated by (3) in FIG. 4).

Thus, the information on voltage regulator(s) 30-1 to 30-3 is regularly obtained, is subjected to a calculation process using MCU 5, and is stored in telemetry register 15.

Generally, a process that employs MCU 5 or the like, which performs a calculation process using a program, tends to be slower than a process in which the processing function is implemented using only a logical circuit.

However, for an operation, such as the telemetry operation, that does not require relatively high-speed processing, it is suitable to perform a process using MCU 5 or the like that performs a calculation process using a program.

It should be noted that even when the process for the normal mode is performed using an MCU 5 having a high processing speed, the telemetry operation may be performed.

Further, in the case where the calculation process is performed using the program, characteristics in the telemetry operation can be readily changed by changing the program and parameter.

For example, there may occur a difference between a temperature managed by the system and a temperature in an actual implementation.

Even in such a case, in accordance with actual conditions in the implementation, a parameter regarding temperature, such as the maximum temperature, can be changed.

Accordingly, the telemetry operation can be set in accordance with the actual implementation.

The example here has illustrated that the plurality of parameters such as output voltage, output current, and temperature are regularly checked.

Figure 6:
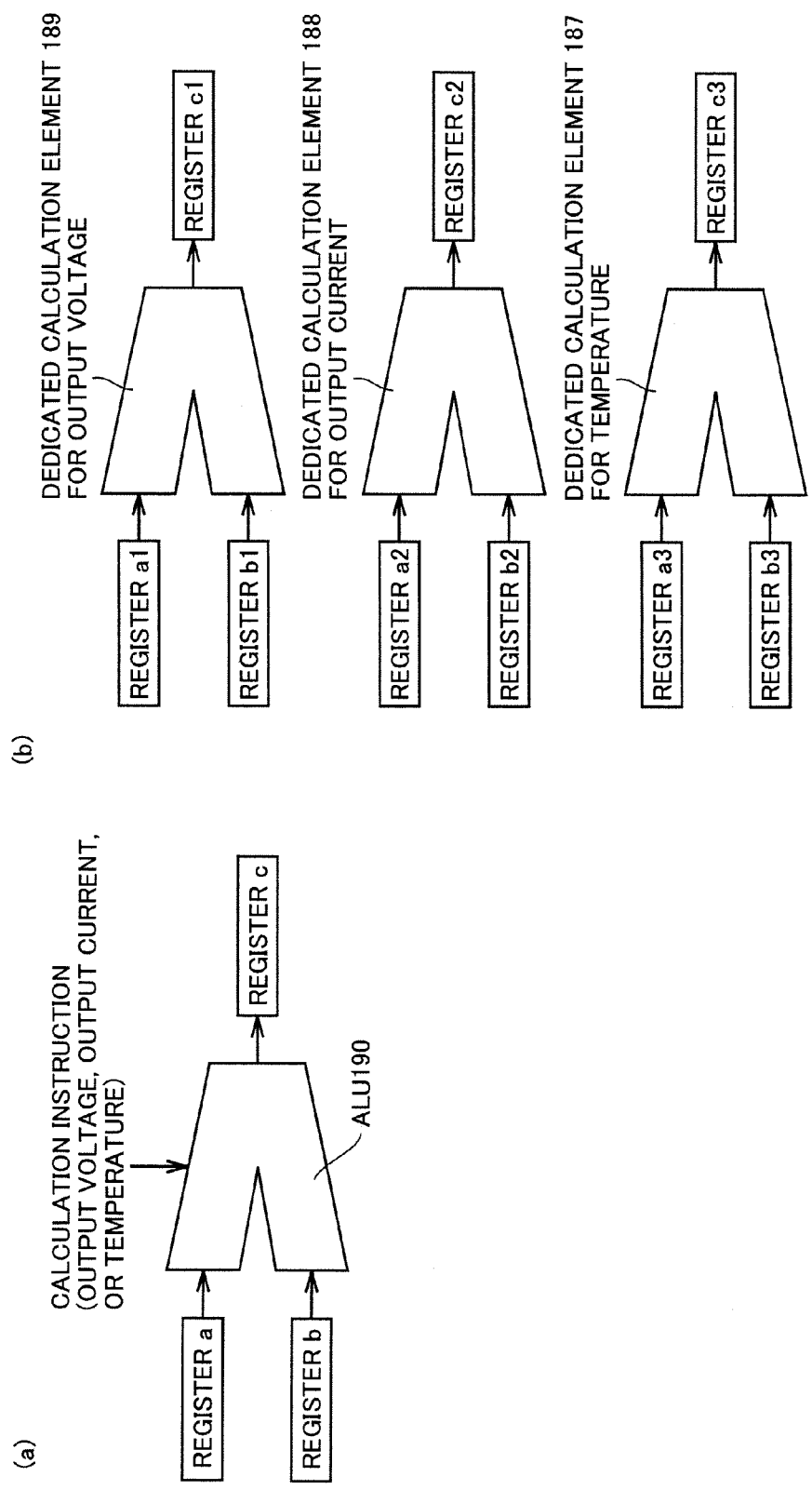
FIG. 6 shows a calculation element of an MCU and dedicated calculation elements.

In this embodiment, as shown in FIG. 6(a), each program is performed using one ALU (Arithmetic and Logic Unit).

Specifically, in order to check an output voltage, the ALU is fed with a calculation instruction that is based on a program for the output voltage, and performs a process. In other words, based on the values of registers a, b, a calculation result is output to a register c.

Likewise, in order to check an output current, the ALU is fed with an instruction for the output current, and performs a process. In order to check a temperature, the ALU is fed with an instruction for the temperature, and performs a process.

Thus, the calculation processes employing the programs leads to reduction of the number of ALUs. Here, one ALU is sufficient because the three programs can be executed. Meanwhile, if dedicated logical circuits are used instead of the calculation circuit employing the programs unlike this embodiment, dedicated calculation circuits (calculation elements) 189, 188, 187 are respectively required for the output voltage, the output current, and the temperature as shown in FIG. 6(b). This results in increased area.

Thus, the area can be reduced by performing the processes using the calculation circuit, which employs the programs, when regularly checking such a plurality of parameters.

Further, in the case where a high processing speed is not required, each state information can be processed in a time-division manner.

[Third Embodiment]

In a third embodiment, a normal operation employing the SVID interface will be described.

In the normal operation, voltage control and power state control are performed.

(Voltage Control)

Figure 7:
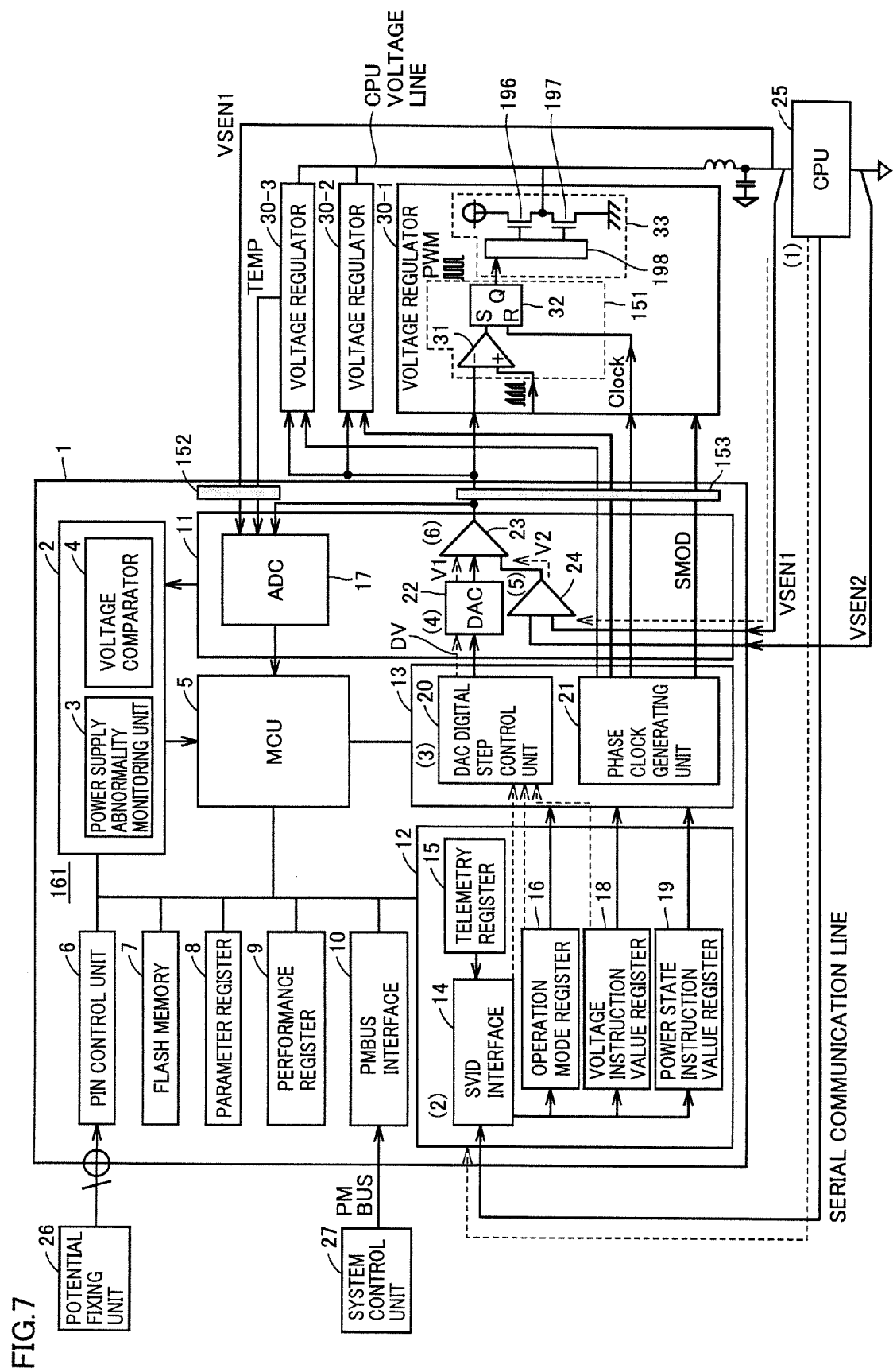
FIG. 7 shows a flow of control during a voltage control operation.

FIG. 7 shows a flow of control during the voltage control operation.

Figure 8:
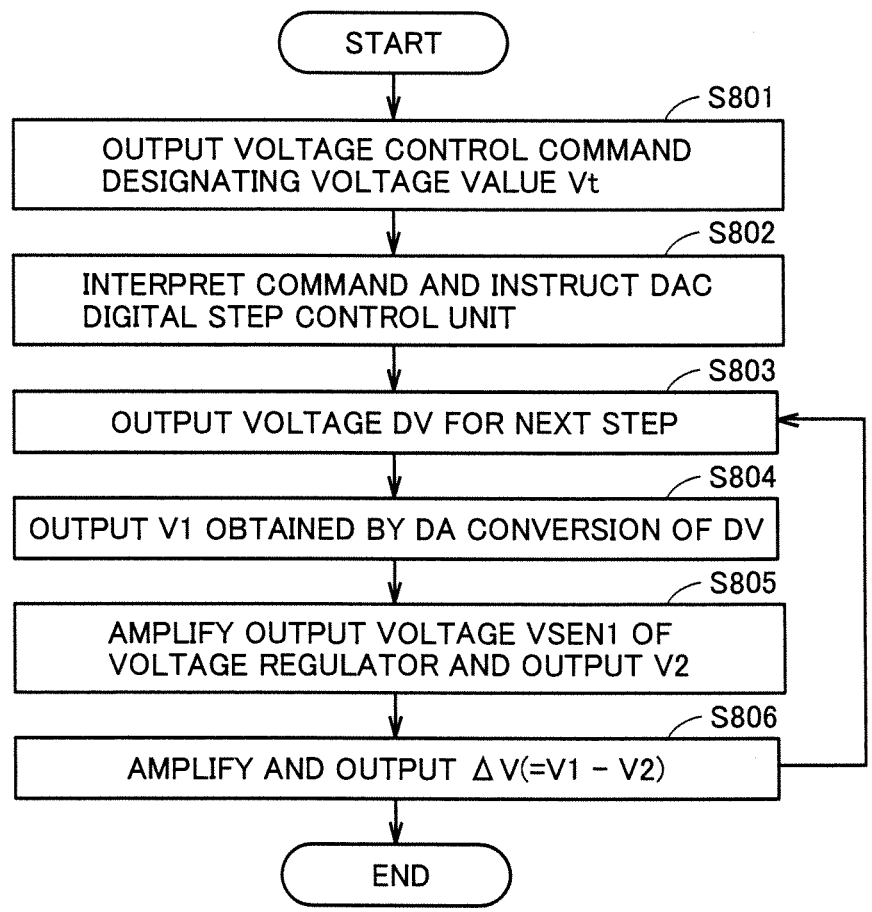
FIG. 8 is a flowchart showing a procedure of process of the voltage control operation.

FIG. 8 is a flowchart showing a procedure of process of the voltage control operation.

Referring to FIG. 7 and FIG. 8, CPU 25 outputs a voltage control command, which designates a voltage value Vt, to the serial communication line (step S801; as indicated by (1) in FIG. 7).

SVID interface 14 receives and interprets the command sent via the serial communication line, and instructs DAC digital step control unit 20 to perform the voltage control (step S802; as indicated by (2) in FIG. 7).

DAC digital step control unit 20 sets the instructed normal instruction voltage Vt as a target value, and outputs a digital voltage DV, to be used in the next step, for attaining this target value (step S803; as indicated by (3) in FIG. 7).

DAC 22 converts digital voltage DV into analog voltage V1 (step S804; as indicated by (4) in FIG. 7).

Differential amplifier 24 amplifies a difference between voltage VSEN1 at the high-potential side of CPU 25 and voltage VSEN2 at the low-potential side of CPU 25, and outputs a voltage V2 (step S805; as indicated by (5) in FIG. 7).

Error amplifier 23 amplifies a difference between voltage V1 output from DAC 22 and voltage V2 output from differential amplifier 24, and outputs the amplified voltage to voltage regulator(s) 30-1 to 30-3 as a voltage indicating a difference between the designated voltage and the voltage of CPU 25 at present (as indicated by (6) in FIG. 7). Voltage regulator(s) 30-1 to 30-3 correct an output voltage based on the voltage output from error amplifier 23 (step S806).

For example, when voltage VSEN1 at the high-potential side is lower than normal instruction voltage Vt, high-side MOS transistor 196 is turned on to increase voltage VSEN1 at the high-potential side.

Meanwhile, when voltage VSEN1 at the high-potential side is higher than normal instruction voltage Vt, low-side MOS transistor 197 is turned on to decrease voltage VSEN1 at the high-potential side.

Thereafter, the process goes back to step S803 and is repeated.

In this way, voltage VSEN1 at the high-potential side is controlled to correspond to normal instruction voltage Vt.

In this way, the voltage control operation here is performed using hard logic power supply control circuit 13 rather than MCU 5.

Hard logic power supply control circuit 13 is generally capable of performing an operation faster than a process that uses a calculation circuit employing a program such as MCU 5.

In other words, in this embodiment, MCU 5 is employed for a process that does not require relatively high processing speed, such as the discharge mode illustrated in the first embodiment or the telemetry operation illustrated in the second embodiment.

On the other hand, hard logic power supply control circuit 13 rather than MCU 5 is employed for the voltage control operation, which is a normal mode in which a higher processing speed is required as compared with the discharge mode or the telemetry operation.

In this way, a high-speed operation can be realized.

Because both MCU 5 and hard logic power supply control circuit 13 are provided, the normal mode such as the voltage control operation can be readily performed in parallel with, for example, the telemetry operation.

It should be noted that when an MCU 5 having a high calculation processing speed is employed, not only the processes for the discharge mode and the telemetry operation but also the process for the normal mode such as the voltage control operation may be performed using MCU 5.

(Power State Control)

The power state control refers to control in which the number of voltage regulators to be operated is set from among a plurality of voltage regulators.

The power state mode is switched in accordance with a magnitude of current consumed by the CPU.

Figure 9:
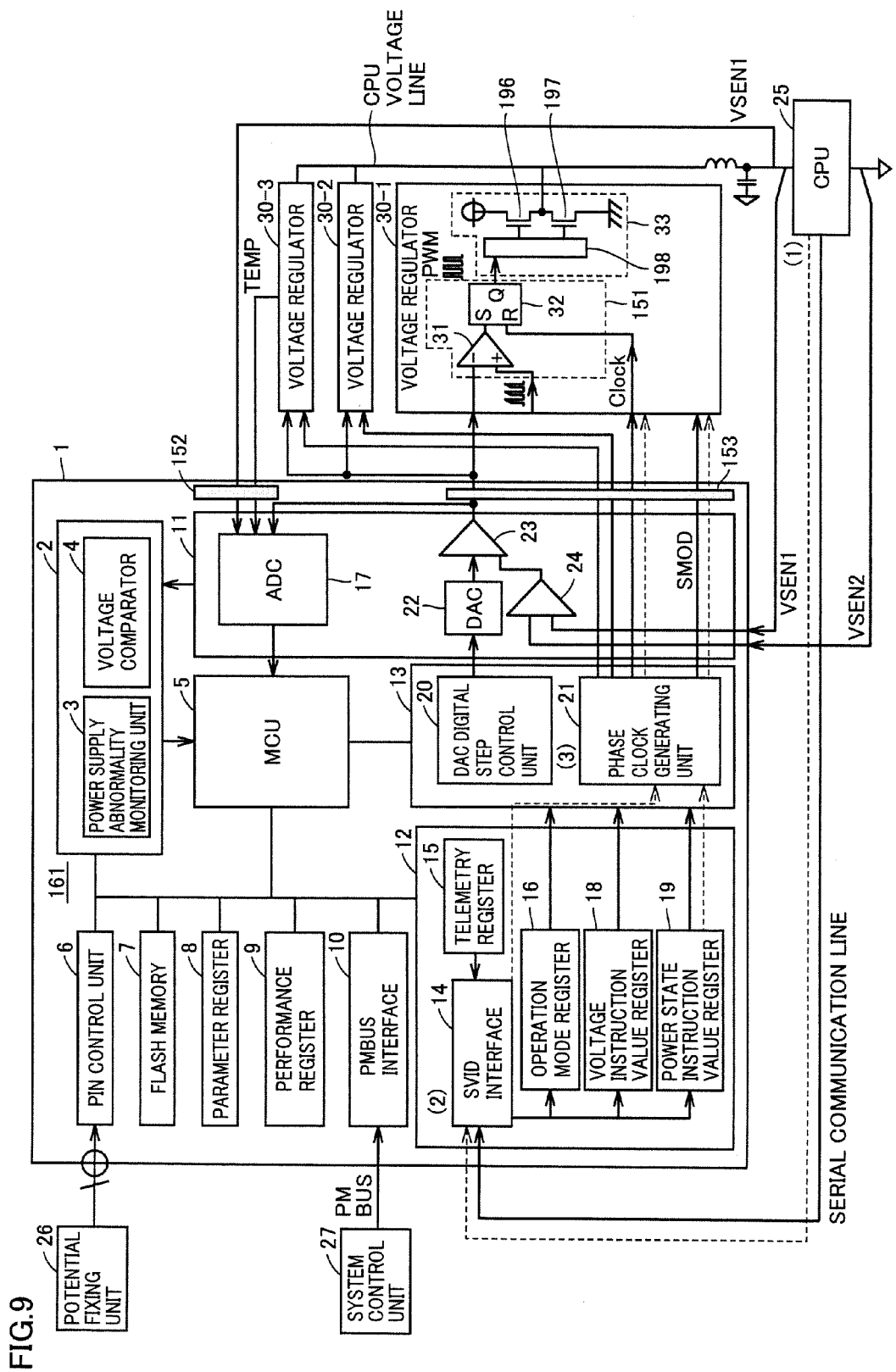
FIG. 9 shows a flow of control during an operation in power state control.

FIG. 9 shows a flow of control during an operation in the power state control.

Figure 10:
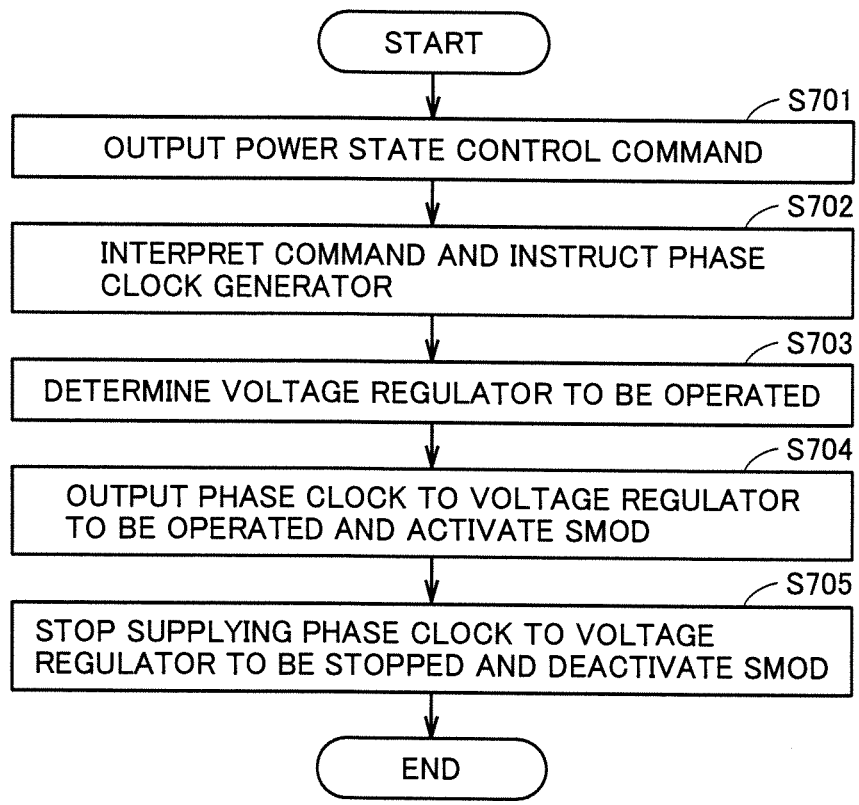
FIG. 10 is a flowchart showing a procedure of process of the operation in the power state control.

FIG. 10 is a flowchart showing a procedure of process of the operation in the power state control.

Referring to FIG. 9 and FIG. 10, CPU 25 outputs a power state control command to the serial communication line (step S701; as indicated by (1) in FIG. 9).

SVID interface 14 receives and interprets the command sent via the serial communication line, and instructs phase clock generating unit 21 to perform the power state control (step S702; as indicated by (2) in FIG. 9).

Phase clock generating unit 21 determines voltage regulator(s) 30-1 to 30-3 to be operated, and phase clock generating unit 21 determines a phase of a phase clock to be supplied to voltage regulator(s) 30-1 to 30-3 to be operated.

For example, when "0" is designated for the power state mode, "0" is stored in power state instruction value register 19. In order to supply load current to CPU 25, phase clock generating unit 21 selects a plurality of voltage regulars to be operated from among voltage regulators 30-1 to 30-3, and determines a phase of a clock to be supplied to those of voltage regulators 30-1 to 30-3.

When "0" is designated for the power state mode, the load current is normally large and stability of voltage with high precision is often required.

Accordingly, the process is performed regularly at a high speed.

Meanwhile, when "1" is designated for the power state mode, "1" is stored in power state instruction value register 19. Phase clock generating unit 21 selects one voltage regulator to be operated from among voltage regulators 30-1 to 30-3, and determines a phase of a clock to be supplied to the voltage regulator.

When "1" is designated for the power state mode, the load current is often normally small.

Hence, the process is performed regularly but power consumption of the voltage regulator is decreased as compared with the case where "0" is set for the power state mode.

When "2" is designated for the power state mode, "2" is stored in power state instruction value register 19. Phase clock generating unit 21 selects one voltage regulator to be operated from among voltage regulators 30-1 to 30-3. In order to supply load current, phase clock generating unit 21 determines a phase of a clock to be supplied to the voltage regulator to be operated, when the voltage reaches or falls below the designated voltage (stored in parameter register 8 by CPU 25 in accordance with another command) (step S703; as indicated by (3) in FIG. 9).

When "2" is designated for the power state mode, the load current is often normally smaller than that in the case where "1" is designated for the power state mode.

Hence, the process is performed irregularly, i.e., is performed only when the voltage is decreased, and power consumption of the voltage regulator is decreased as compared with the case where "1" is set for the power state mode.

Phase clock generating unit 21 activates control signal SMOD for the one or the plurality of voltage regulars to be operated among voltage regulators 30-1 to 30-3, and outputs the determined phase clock to voltage regulator(s) 30-1 to 30-3 to be operated. When voltage regulator(s) 30-1 to 30-3 receive the activated control signal SMOD, voltage regulator(s) 30-1 to 30-3 output voltage based on the clock sent from phase clock generating unit 21 (step S704; as indicated by (3) in FIG. 9).

Phase clock generating unit 21 deactivates control signal SMOD for the one or the plurality of voltage regulars to be stopped among voltage regulators 30-1 to 30-3. When voltage regulator(s) 30-1 to 30-3 receive deactivated control signal SMOD, voltage regulator(s) 30-1 to 30-3 stop outputting the voltage (step S705; as indicated by (3) in FIG. 9).

Here, it has been illustrated that hard logic power supply control circuit 13 is employed for the operation in the power state control.

However, for example, in the case where the process is performed irregularly as in the case where "2" is designated for the power state mode, i.e., the process is performed only when the voltage is decreased, the process may be performed using MCU 5.

[Fourth Embodiment]

In a fourth embodiment, an urgent shutdown operation will be described. When the output voltage of voltage regulator(s) 30-1 to 30-3 is increased too high, the semiconductor system needs to be shut down urgently. Hence, the shutdown process is performed without using MCU 5.

Figure 11:
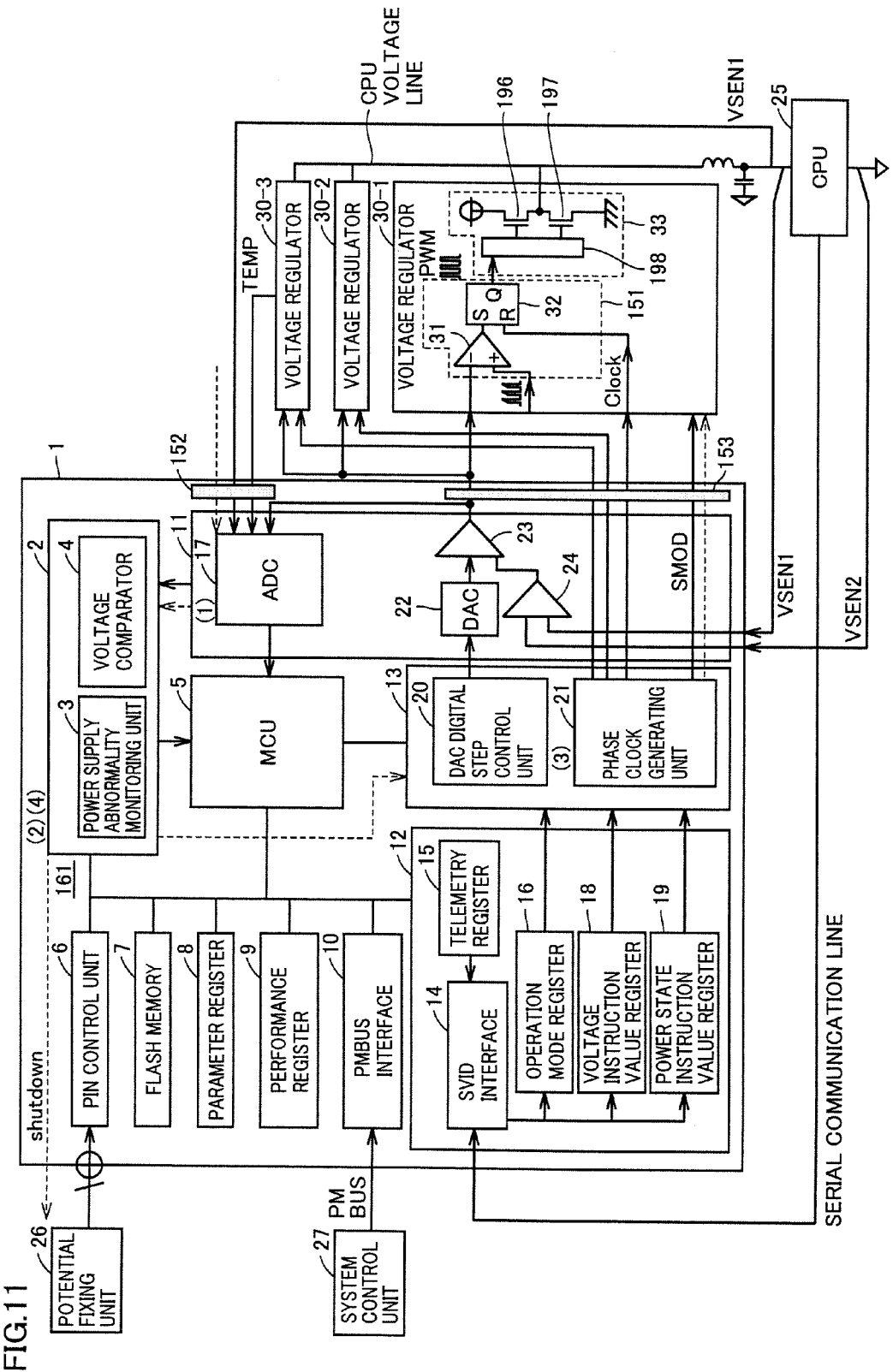
FIG. 11 shows a flow of control during an urgent shutdown operation.

FIG. 11 shows a flow of control during the urgent shutdown operation.

Figure 12:
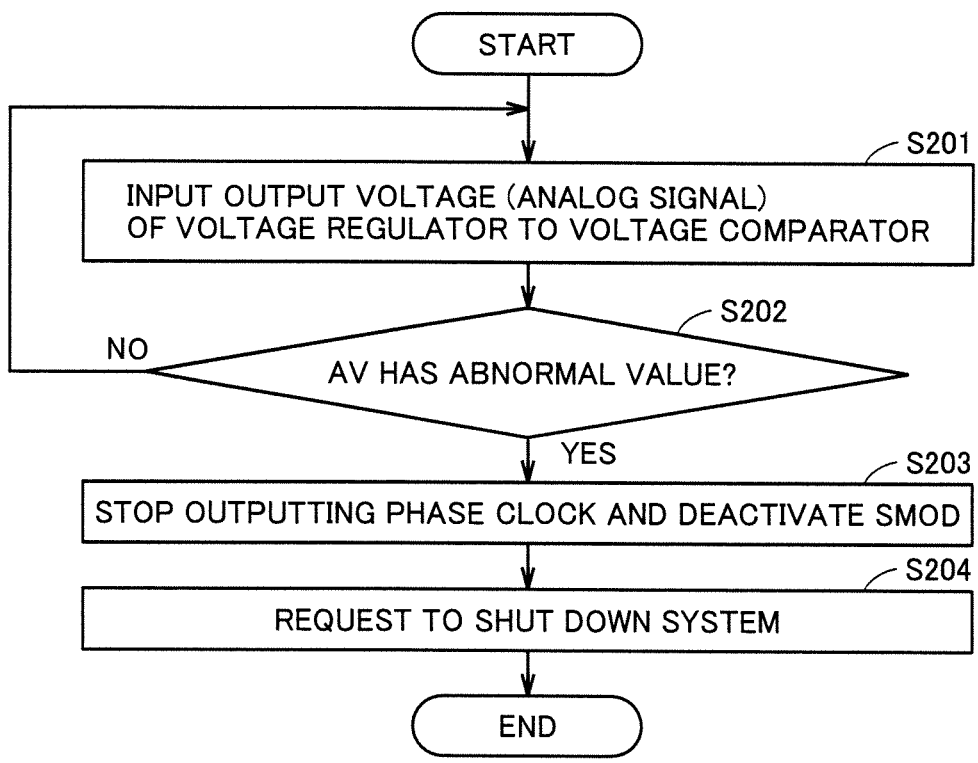
FIG. 12 is a flowchart showing a procedure of process of the urgent shutdown operation.

FIG. 12 is a flowchart showing a procedure of process of the urgent shutdown operation.

Voltage comparator 4 receives an analog voltage value AV from the voltage regulator. Voltage comparator 4 compares a voltage threshold value stored in advance with the analog signal value (step S201).

When analog voltage value AV is larger than the voltage threshold value (YES in step S202), power supply abnormality monitoring unit 3 notifies phase clock generating unit 21 of abnormality in the voltage (as indicated by (2) in FIG. 11). Phase clock generating unit 21 stops outputting the phase clock, and negates control signal SMOD. When voltage regulator(s) 30-1 to 30-3 receive control signal SMOD thus negated, voltage regulator(s) 30-1 to 30-3 stop supplying electric power (step S203; as indicated by (3) in FIG. 11).

Further, power supply abnormality monitoring unit 3 outputs a Shutdown signal to an external component so as to request shutdown of the semiconductor system (step S204; as indicated by (4) in FIG. 11).

Thus, during the urgent shutdown operation, the voltage comparator performs the comparison process for the analog signal without converting the analog signal received from the voltage regulator into a digital signal.

Accordingly, it takes a shorter time to detect abnormality than that in a configuration in which the analog signal is converted into the digital signal before the comparison, thereby achieving a high-speed operation.

Now, combinations with the first, second, and third embodiments are contemplated as follows.

In the discharge mode, the process can be performed using the MCU, whereas during the urgent shutdown operation, the process can be performed at a high speed using the voltage comparator, which can handle an analog signal input, rather than the MCU.

Alternatively, in the telemetry mode, the process can be performed using the MCU, whereas during the urgent shutdown operation, the processing can be performed at a high speed using the voltage comparator, which can handle an analog signal input, rather than the MCU.

Alternatively, in the normal mode, the process can be performed using hard logic power supply control circuit 13, whereas during the urgent shutdown operation, the additionally provided voltage comparator for the analog signal can be employed for the process, whereby the urgent shutdown operation can be performed independently of the normal mode.

The description above has illustrated that two operations are combined, but three or more operations may be combined.

[Variation of Fourth Embodiment]

In the embodiment of the present invention, when analog voltage value AV is larger than the voltage threshold value, power supply abnormality monitoring unit 3 notifies phase clock generating unit 21 of the abnormality in voltage, and requests the external component to shut down the semiconductor system. However, the present invention is not limited to this.

For example, when analog voltage value AV is larger than the voltage threshold value, power supply abnormality monitoring unit 3 outputs a signal to MCU 5 so as to notify it. Based on a program, MCU 5 causes phase clock generating unit 21 to stop outputting the phase clock, negate control signal SMOD, and stop each component within controller 1.

In this case, the process is performed using MCU 5, and is therefore possibly slower than a process in which an instruction is provided directly from power supply abnormality monitoring unit 3 to phase clock generating unit 21 without using MCU 5.

The use of MCU 5 allows each component in controller 1 to be stopped.

For example, the supply of each signal or electric power to controller 1 or output of each signal therefrom can be stopped readily.

Further, power supply abnormality monitoring unit 3 may concurrently send a signal indicating the urgent stopping instruction to phase clock generating unit 21 and MCU 5.

Accordingly, the instruction can be provided promptly to phase clock generating unit 21 while concurrently providing the instruction to the other portion.

Further, when analog voltage value AV is larger than the voltage threshold value, power supply abnormality monitoring unit 3 outputs the Shutdown signal to the external component to request shutdown of the semiconductor system, but may output a Fault signal to notify that the abnormality has been detected.

In other words, the abnormality may be notified without requesting to shut down the semiconductor system, and the system itself may determine whether to shut down, in accordance with the type of abnormality.

[Fifth Embodiment]

In a fifth embodiment, control through the PMBUS will be described.

For communication through the PMBUS, as with the communication through the SVID, commands for performing functions such as power supply voltage control, power state control, and telemetry are prepared. However, with the PMBUS, communication is performed at a lower speed than that with the SVID. An instruction provided through the PMBUS does not require high-speed response, so that the power supply voltage is controlled through MCU 5.

(Voltage Control)

Figure 13:
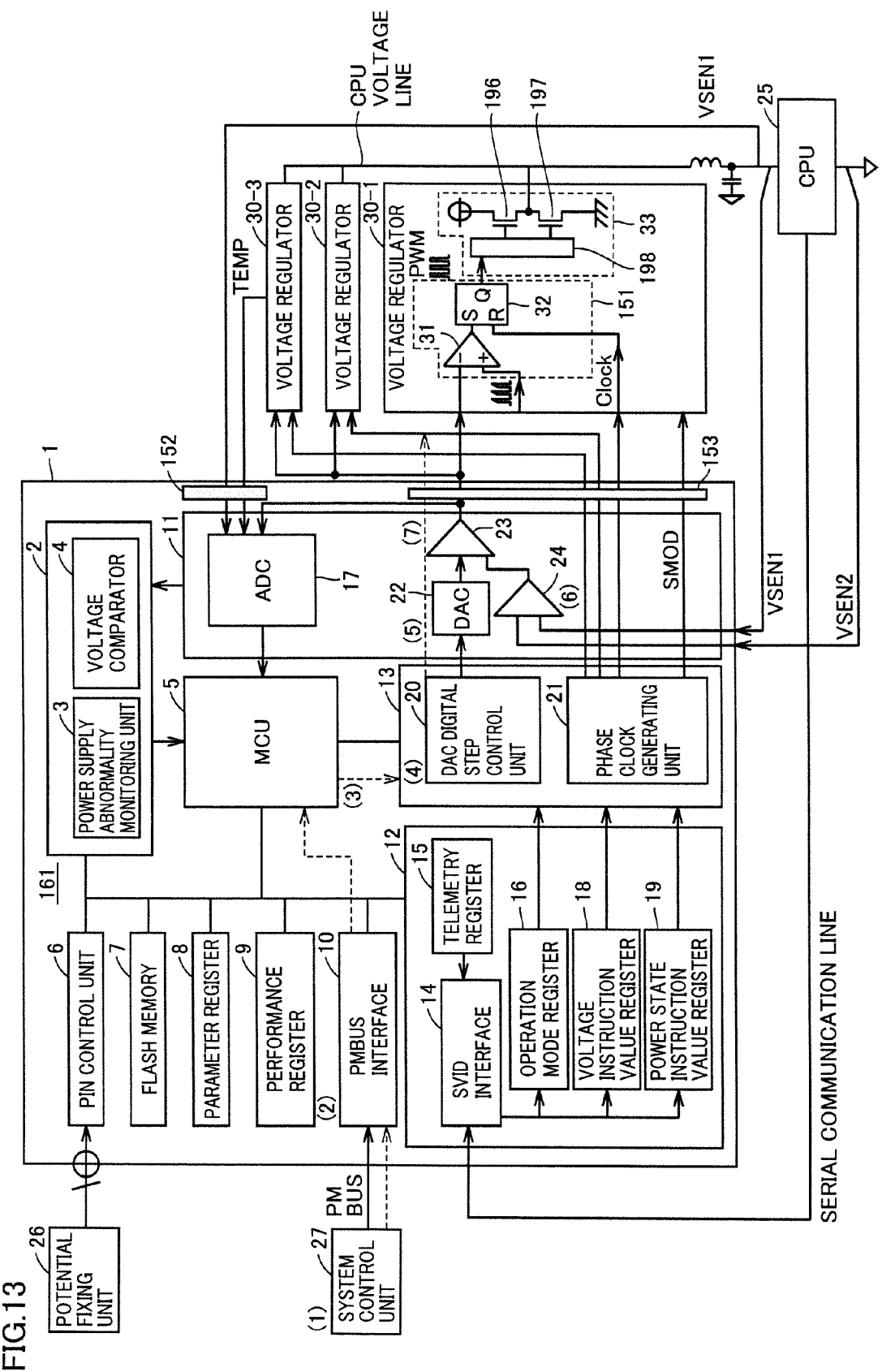
FIG. 13 shows a flow of control for executing an instruction provided via a PMBUS.

FIG. 13 shows a flow of control for executing an instruction provided via the PMBUS.

Figure 14:
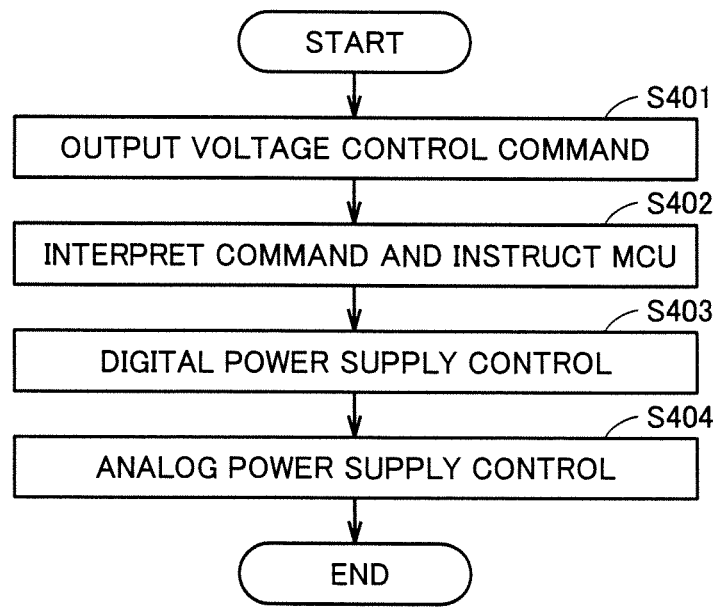
FIG. 14 is a flowchart showing a procedure of executing the instruction provided via the PMBUS.

FIG. 14 is a flowchart showing a procedure of executing the instruction provided via the PMBUS.

Referring to FIG. 13 and FIG. 14, system control unit 27 sends a voltage control command, which instructs a voltage value Vt, to the PMBUS (step S401; as indicated by (1) in FIG. 13).

PMBUS interface 10 receives and interprets the command sent via the PMBUS, and instructs MCU 5 to perform voltage control (step S402; as indicated by (2) in FIG. 13). MCU 5 instructs DAC digital control step unit 20 to perform the voltage control (as indicated by (3) in FIG. 13).

DAC digital step control unit 20 sets the instructed normal instruction voltage Vt as a target value, and outputs a digital voltage DV, to be used in the next step, for attaining this target value (step S403; as indicated by (4) in FIG. 13).

DAC 22 converts digital voltage DV into analog voltage V1 (step S404; as indicated by (5) in FIG. 13).

Differential amplifier 24 amplifies a difference between voltage VSEN1 at the high-potential side of CPU 25 and voltage VSEN2 at the low-potential side of CPU 25, and outputs a voltage V2 (step S405; as indicated by (6) in FIG. 13).

Error amplifier 23 amplifies a difference between voltage V1 output from DAC 22 and voltage V2 output from differential amplifier 24, and outputs the amplified voltage to voltage regulator(s) 30-1 to 30-3 as a voltage indicating a difference between the designated voltage and the voltage of CPU 25 at present (as indicated by (7) in FIG. 13). Voltage regulator(s) 30-1 to 30-3 correct an output voltage based on the voltage output from error amplifier 23 (step S406).

For example, when voltage VSEN1 at the high-potential side is lower than normal instruction voltage Vt, high-side MOS transistor 196 is turned on to increase voltage VSEN1 at the high-potential side.

Meanwhile, when voltage VSEN1 at the high-potential side is higher than normal instruction voltage Vt, low-side MOS transistor 197 is turned on to decrease voltage VSEN1 at the high-potential side.

Thereafter, the process goes back to step S403 and is repeated.

In this way, voltage VSEN1 at the high-potential side is controlled to correspond to normal instruction voltage Vt.

In this way, the voltage control operation here is performed using both MCU 5 and hard logic power supply control circuit 13.

It tends to take a shorter time to reach instruction voltage Vt from a certain voltage by the voltage control through the SVID as described in the third embodiment than a time taken to reach instruction voltage Vt from the certain voltage by the voltage control through the SVID. This is due to the following reason. That is, the voltage control through the SVID employs hard logic power supply control circuit 13 rather than MCU 5, whereas the voltage control through the PMBUS employs both MCU 5 and hard logic power supply control circuit 13.

However, when an MCU 5 having a higher calculation processing speed is employed, both times can be almost the same.

(Telemetry Operation)

Figure 15:
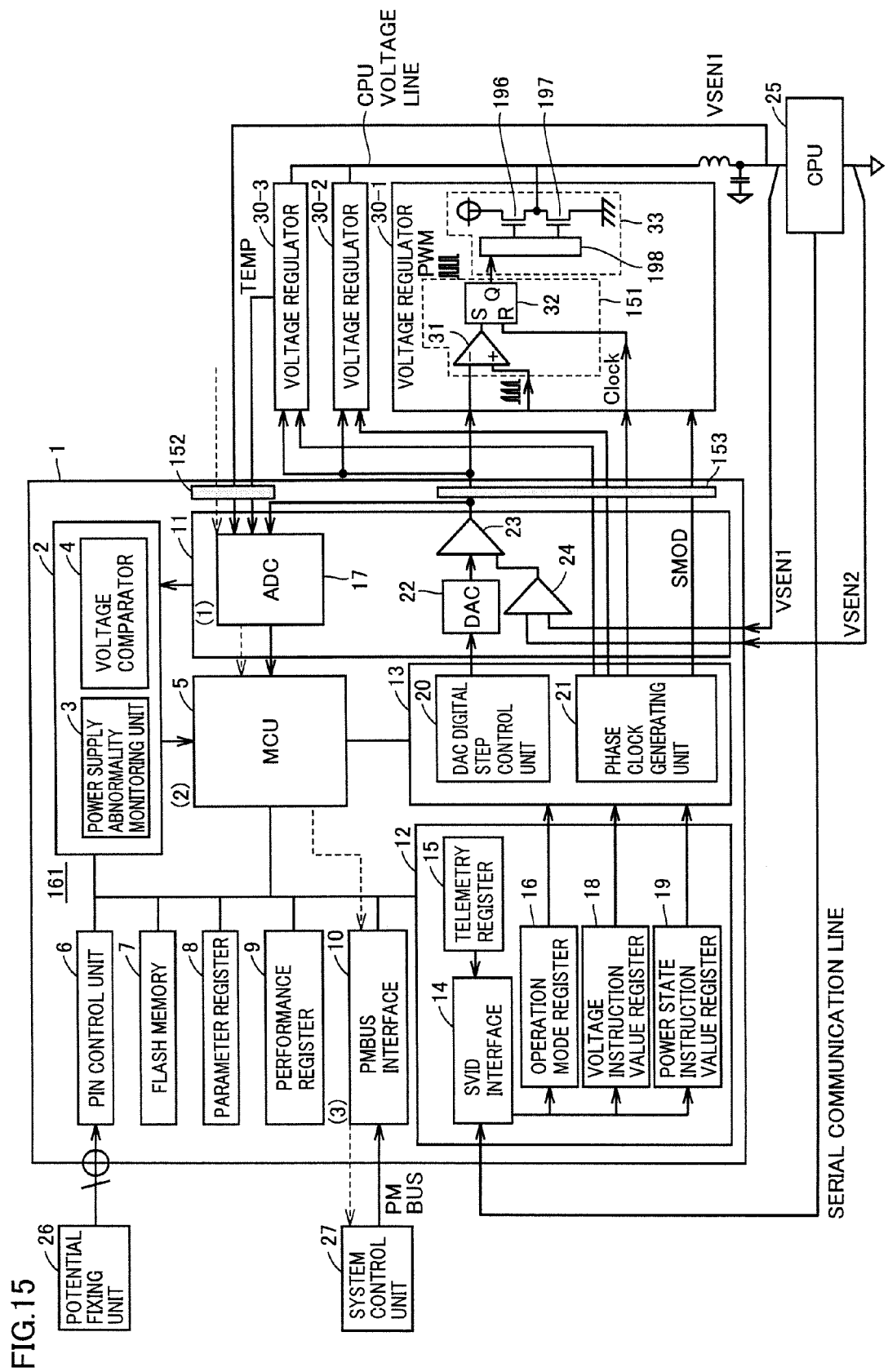
FIG. 15 shows a flow of control during the telemetry operation.

FIG. 15 shows a flow of control during the telemetry operation.

Figure 16:
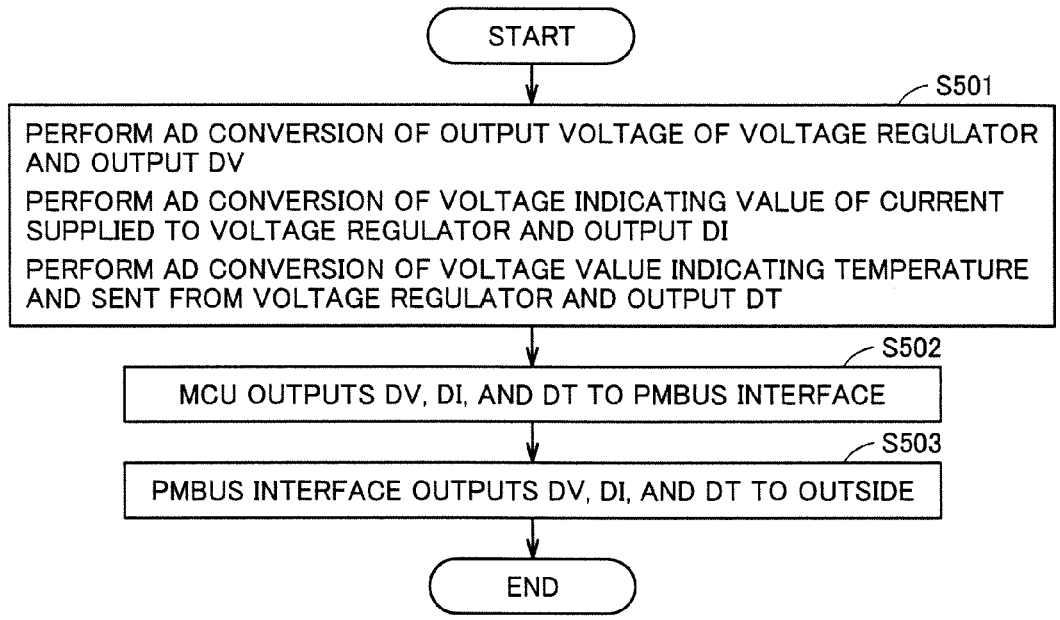
FIG. 16 is a flowchart showing a procedure of process of the telemetry operation.

FIG. 16 is a flowchart showing a procedure of process of the telemetry operation.

Referring to FIG. 15 and FIG. 16, ADC 17 performs AD conversion of the output voltage of voltage regulator(s) 30-1 to 30-3 at a first timing in μsec order, and sends digital voltage value DV to MCU 5 (step S501; as indicated by (1) in FIG. 15).

Further, ADC 17 performs AD conversion of a voltage value, which indicates a temperature and is sent from a temperature chip in voltage regulator(s) 30-1 to 30-3, at a second timing in μsec order and sends a digital voltage value DT' to MCU 5.

Further, ADC 17 performs AD conversion of a voltage value, which indicates a value of current supplied to voltage regulator(s) 30-1 to 30-3, at a second timing in μsec order and sends a digital voltage value Df to MCU 5.

Further, ADC 17 performs AD conversion of a voltage value, which indicates a temperature and sent from a temperature chip in voltage regulator(s) 30-1 to 30-3, at a third timing in μsec order and sends digital voltage value DE to MCU 5 (step S501; as indicated by (1) in FIG. 15).

Next, MCU 5 sends digital voltage value DV' to PMBUS interface 10 as the latest digital voltage value DV.

MCU 5 sends digital current value DT' to PMBUS interface 10 as the latest digital current value DI.

MCU 5 sends digital temperature value DT' to PMBUS interface 10 as the latest digital temperature value DT (step S502; as indicated by (2) in FIG. 15).

Next, system control unit 27 receives digital voltage value DV, digital current value DI, and/or digital temperature value DT via PMBUS interface 10 (step S503; as indicated by (3) in FIG. 15).

As described above, in the present embodiment, in the communication method that does not highly require high-speed processing such as the PMBUS interface, the processes for the voltage control operation, which is a normal operation, and the telemetry operation are performed using the MCU.

When viewing from a different point of view, usage of the MCU may differ depending on a speed required for a communication method in the case where the controller can be operated in accordance with two communication methods or two externally controlling methods (interfaces).

For example, the MCU is used for the process for the voltage control operation that is the normal operation or the process for the telemetry operation when using the PMBUS interface (low-speed communication method) with which a lower speed process is permitted as compared with that with the SVID interface (high-speed communication method).

In contrast, when using the SVID interface, the process for the voltage control operation that is a normal operation is performed using the hard logic circuit rather than the MCU, whereas the process for the telemetry operation is performed using the MCU.

Thus, the ratio of usage of the MCU may differ depending on the type of communication speed. In other words, the ratio of usage of the MCU may be made lower as an interface requires a higher speed.

It should be noted that the ratio of usage of the MCU may not be changed for each interface in the case where an MCU is developed to achieve a higher calculation processing speed.

[Sixth Embodiment]

In a sixth embodiment, a configuration for calculating a difference by means of a DSP will be described.

Figure 17:
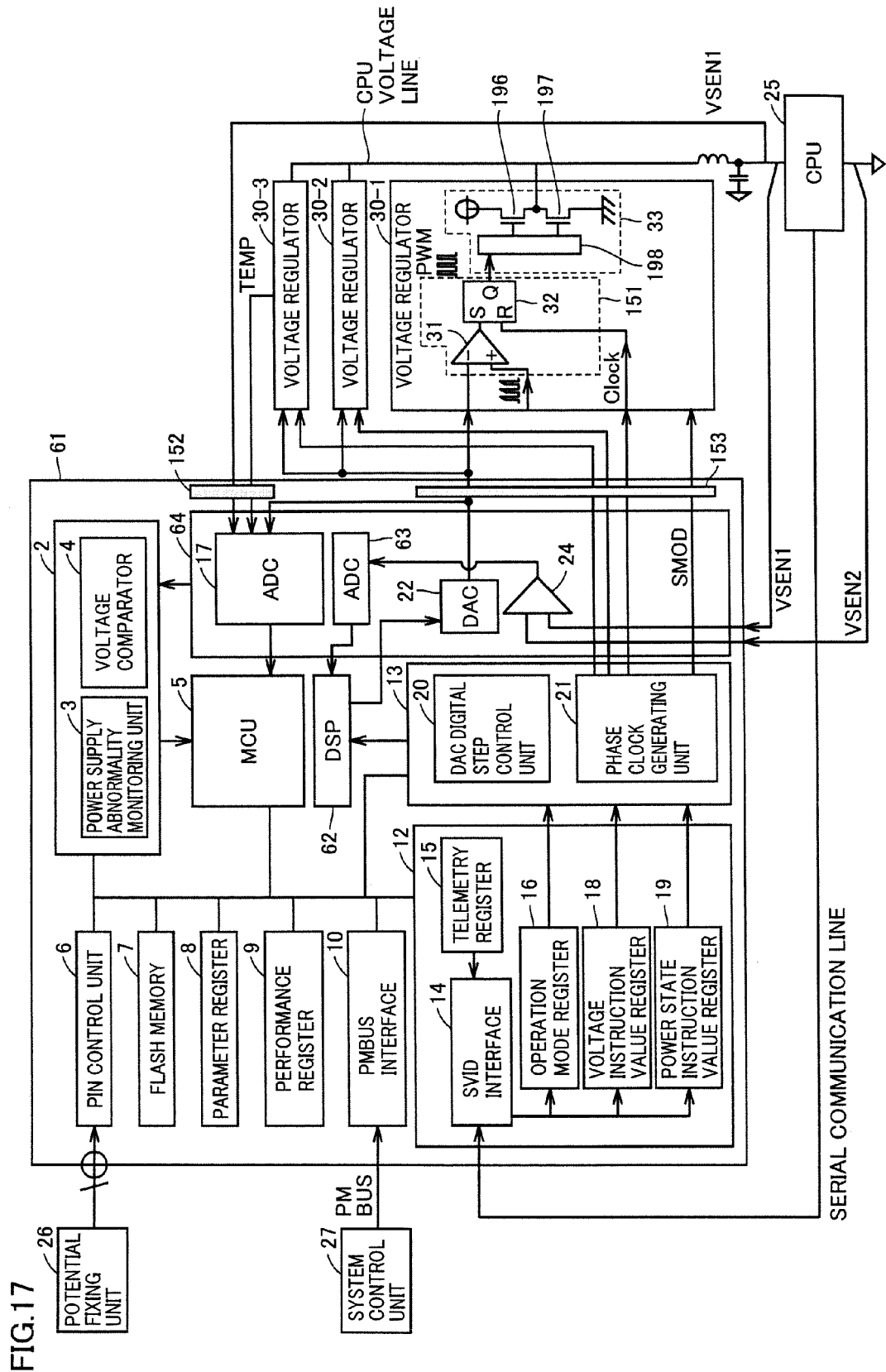
FIG. 17 shows a configuration of a semiconductor system of a sixth embodiment.

FIG. 17 shows a configuration of a semiconductor system of the sixth embodiment.

The configuration of FIG. 17 is different from the configuration of FIG. 1 in the following point.

That is, a controller 61 in FIG. 17 includes a DSP, and includes an ADC 63 instead of error amplifier 23.

In the first embodiment, a difference (error) between a voltage output from the amplifier and a voltage output from DAC digital step control unit 20 is calculated digitally. On the other hand, in the present embodiment, a difference (error) between a voltage output from differential amplifier 24 and a voltage output from DAC digital step control unit 20 is calculated digitally.

DAC digital step control unit 20 sends a digital voltage V1 to DSP 62. On the other hand, differential amplifier 24 sends an analog voltage to ADC 63. ADC 63 receives the analog voltage and converts it to a digital value V2.

DSP 62 receives digital voltage V1 and digital voltage V2, and sends a voltage value of (V2−V1) to DAC 22. DAC 22 receives the voltage value of (V2−V1) and converts it to an analog voltage.

Thus, the difference is calculated using DAC 22. Accordingly, this configuration can flexibly deal with changes in standard or design, as compared with the case where the difference is calculated using error amplifier 23.

[Seventh Embodiment]

In a seventh embodiment, a configuration in which MCU 5 and the hard logic power supply control circuit are replaced with a DSP will be described.

Figure 18:
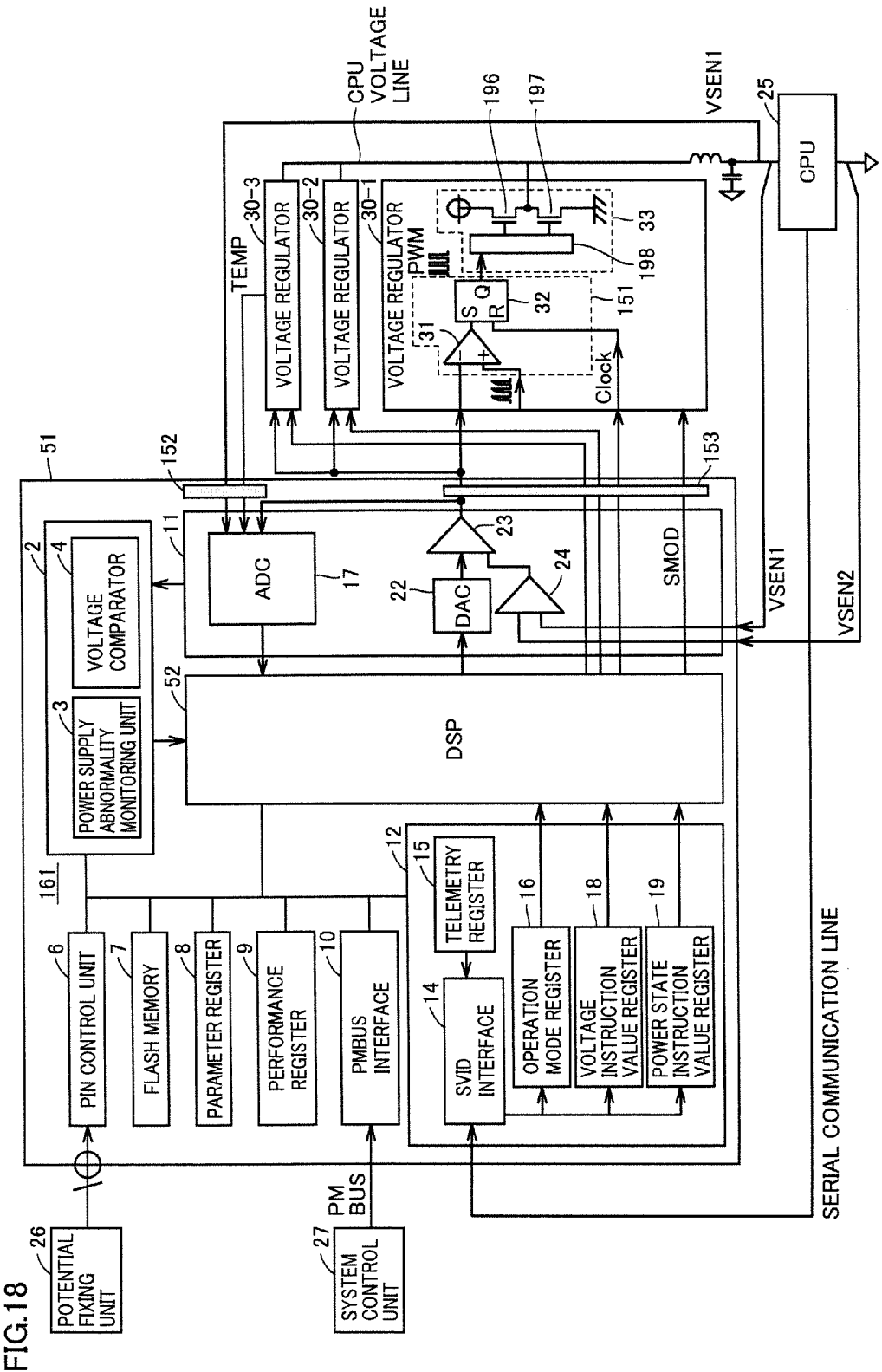
FIG. 18 shows a configuration of a semiconductor system of a seventh embodiment.

FIG. 18 shows a configuration of a semiconductor system of the seventh embodiment.

The configuration of FIG. 18 is different from the configuration of FIG. 1 in the following point.

That is, in a controller 51 of FIG. 18, the functions of MCU 5, the DAC digital control step unit, and phase clock generating unit 21 in the first embodiment are implemented by one DSP 52.

DSP 52 performs a process specific to a command dedicated to power supply control. Accordingly, the circuit size thereof can be smaller than that of MCU 5. Moreover, DSP 52 performs a process at a higher speed than that of MCU 5. Further, the DSP is versatile. Accordingly, this configuration can flexibly deal with changes in standard or design, as compared with a hard logic.

In this example, the DSP performs the process for the voltage control, which is a normal operation, as well as the processes for the discharge operation and the telemetry operation.

It should be noted that the voltage control, which is a normal operation, may be implemented by a hard logic circuit rather than the DSP and the processes for the discharge operation and the telemetry operation may be performed using the DSP.

[Eighth Embodiment]

Figure 19:
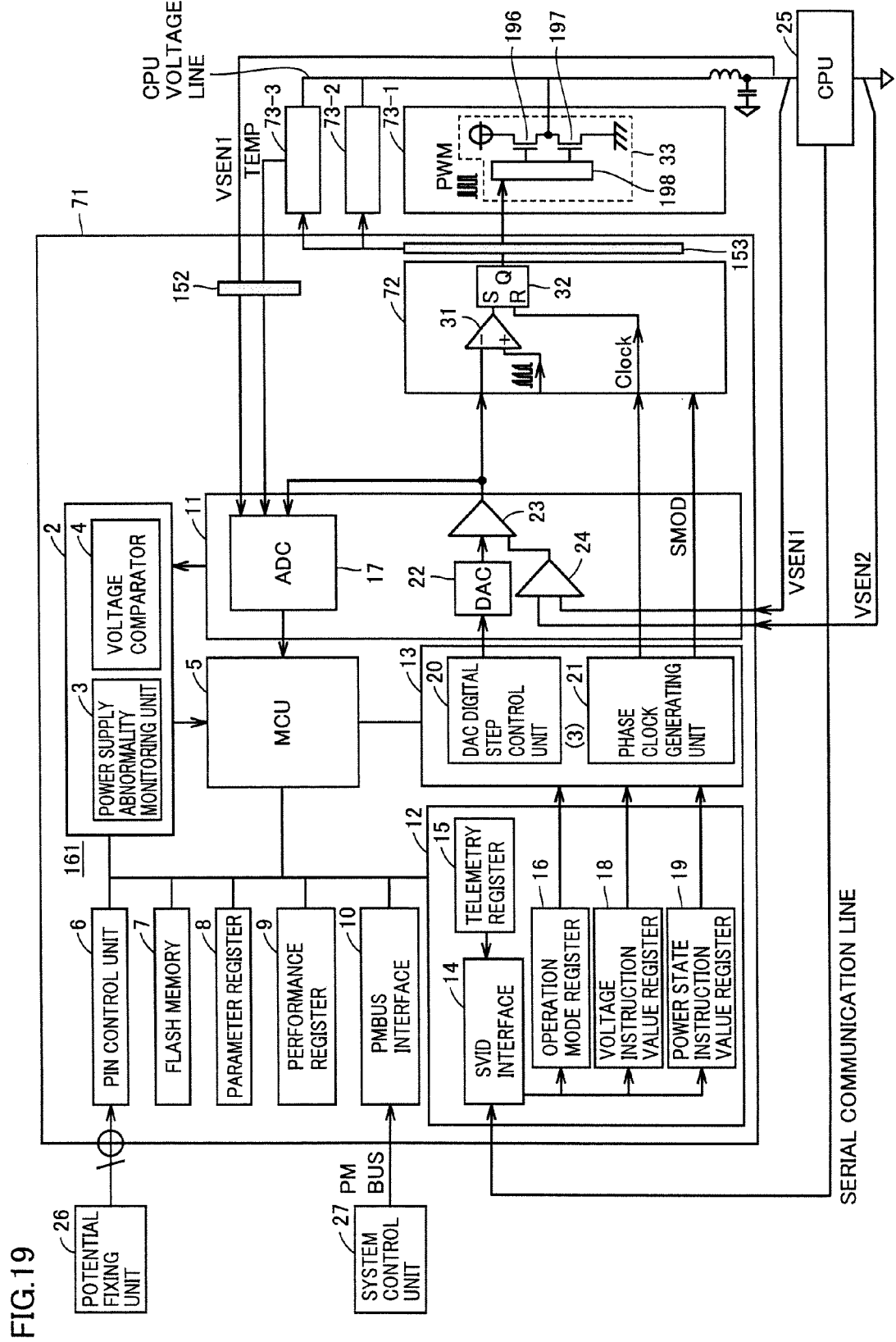
FIG. 19 shows a configuration of a semiconductor system of an eighth embodiment.

FIG. 19 shows a configuration of a semiconductor system of an eighth embodiment.

The configuration of FIG. 19 is different from the configuration of FIG. 1 in the following point.

That is, in the eighth embodiment, a controller 71 has a PWM unit 72 unlike PWM units 151 respectively provided in voltage regulators 30-1 to 30-3. In other words, PWM unit 72 is formed in one chip. Accordingly, each of voltage regulators 73-1 to 73-3 does not need to be provided with a PWM unit.

The configuration of PWM unit 72 is the same as the PWM unit in the first embodiment of FIG. 1, and will not be described repeatedly.

[Ninth Embodiment]

In a ninth embodiment, an example of utilization of the flash memory apart from storage of a program will be described.

Figure 20:
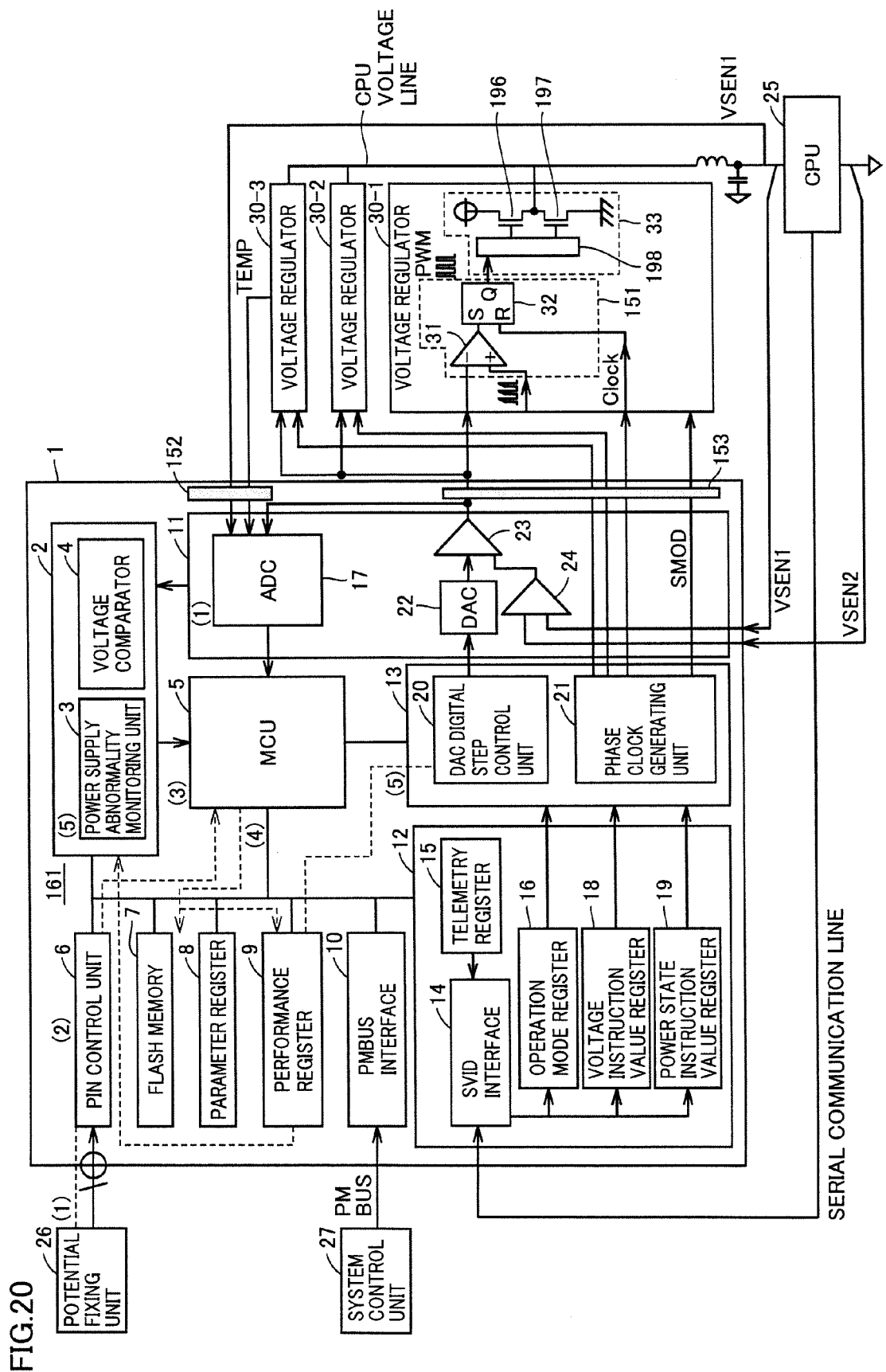
FIG. 20 shows a flow of control when setting a parameter.

FIG. 20 shows a flow of control when setting a parameter.

Figure 21:
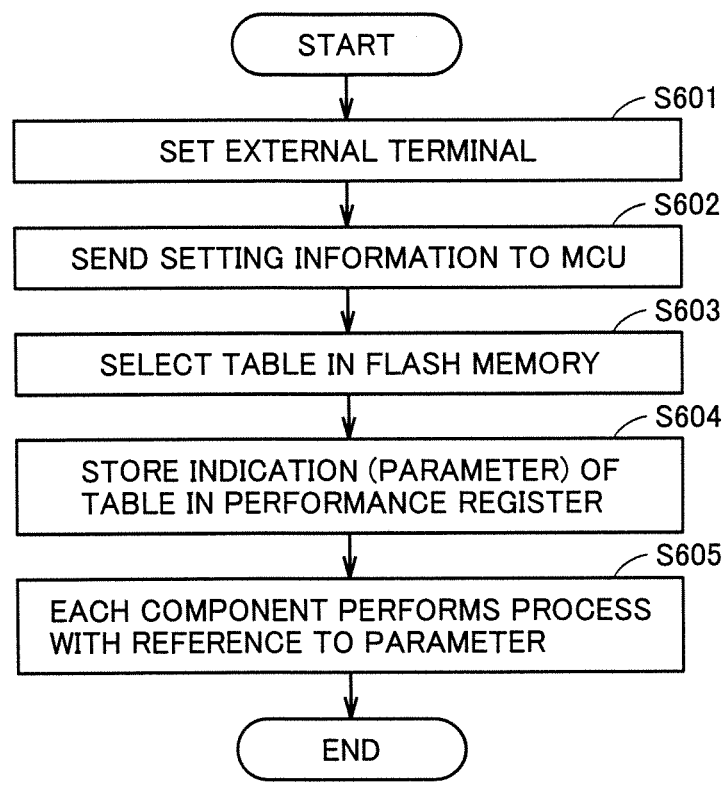
FIG. 21 is a flowchart showing a procedure of process of setting a parameter.

FIG. 21 is a flowchart showing a procedure of process of setting a parameter.

Referring to FIG. 20 and FIG. 21, potential fixing unit 26 sets a voltage of the external terminal of the controller. For example, in the case where there are a plurality of external terminals, potential fixing unit 26 sets each terminal at a Low level or a High level (step S601; as indicated by (1) in FIG. 20).

Next, PIN control unit 6 sends setting information, which indicates how the external terminal has been set, to MCU 5 (step S602; as indicated by (2) in FIG. 20).

Figures 22, 23:
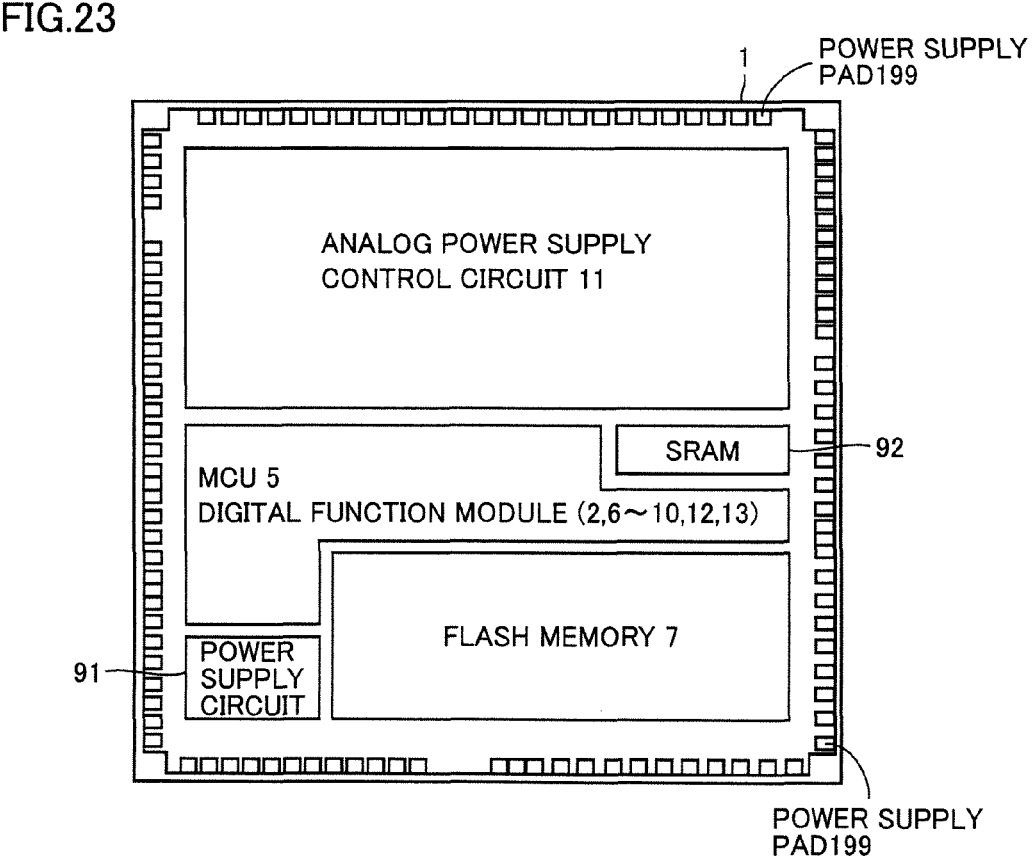
FIG. 22 shows examples of a table.
FIG. 23 shows an arrangement of components in a controller in an embodiment of the present invention.

MCU 5 receives the setting information, and selects a table in flash memory 7 based on the setting information. FIG. 22 shows examples of such a table. As shown in FIG. 22, initial values for the permissible maximum voltage value, the permissible maximum temperature, and the permissible maximum current are defined in each of tables 0 to 3. For example, in the case where there are two external terminals, MCU 5 sets each terminal at a Low level or a High level, thereby selecting one from the four tables (step S603; as indicated by (3) in FIG. 20).

MCU 5 stores the indications of the selected table in performance register 9. The values of the parameters can be updated by CPU 25 or system control unit 27 (step S604; as indicated by (4) in FIG. 20).

With reference to the parameters thus stored in performance register 9, each component performs a process. For example, power supply abnormality monitoring unit 3 compares a parameter, such as the permissible maximum current value, the permissible maximum temperature value, the permissible maximum voltage value, or the permissible lower limit voltage value, with detected current, temperature, or voltage, so as to monitor abnormality in power supply (step S605; as indicated by (5) in FIG. 20).

[Tenth Embodiment]

In the tenth embodiment, an arrangement of components of controller 1 in a chip will be described.

FIG. 23 shows an arrangement of components in controller 1 in the embodiment of the present invention.

Quadrangles arranged in the circumference of the chip represent electrode pads 199.

Referring to FIG. 23, analog power supply control circuit 11 is provided with a circuit, such as DAC 22, which requires high precision. Hence, analog power supply control circuit 11 needs to prevent its characteristics as much as possible from being deteriorated due to fluctuation in power supply line.

On the other hand, flash memory 7 is provided with a charge pump circuit that operates when writing or reading data. Accordingly, an amount of consumption of current is fluctuated greatly when writing or reading data. Accordingly, noise is likely to be generated in the power supply line.

Thus, in order to prevent the power supply line of analog power supply control circuit 11 from being interfered with flash memory 7, analog power supply control circuit 11 and flash memory 7 are positioned at locations separated from each other as far as possible in the present embodiment as shown in FIG. 23.

Further, in the present embodiment, a logic circuit and an SRAM 92, which are less likely to be influenced by noise, are positioned between analog power supply control circuit 11 and flash memory 7. This arrangement is made in consideration of such a fact that MCU 5 and a logic part constructing a digital function module of peripheral functions thereof are designed to be synchronized in accordance with a system clock. For the logic part, an influence of noise is only a short timing for obtainment of data in accordance with a clock edge, and countermeasures against decrease of voltage and crosstalk are taken in consideration of the influence of noise. Accordingly, in the present embodiment, such a logic part having noise immunity is disposed at a location, in which noise is likely to be generated, between analog power supply control circuit 11 and flash memory 7.

Further, in the present embodiment, analog power supply control circuit 11 is positioned along a side of the contour of semiconductor chip 1, whereas flash memory 7 is positioned along a different side (preferably, opposite side) of the contour of semiconductor chip 1.

In this way, the input/output terminals serving as electrode pads 199 connected to analog power supply control circuit 11 can be separated from the input/output terminals serving as the electrode pads connected to analog power supply control circuit 11. Accordingly, mutual interference resulting from noise can be reduced.

Heretofore, the first to tenth embodiments have been exemplified and illustrated. These embodiments may be appropriately combined, or a portion of an embodiment may be combined with a portion of another embodiment.

Further, it has been illustrated that the parameters or the programs are stored in flash memory 7, but may be stored in a different nonvolatile memory such as a ROM or an MRAM.

REFERENCE SIGNS LIST 1, 61: controller; 2: power supply abnormality monitoring circuit; 3: power supply abnormality monitoring unit; 4: voltage comparator; 5: MCU; 6: PIN control unit; 7: flash memory; 8: parameter register; 9: performance register; 10: PMBUS interface; 11, 64: analog power supply control circuit; 12: SVID command determining circuit; 13: hard logic power supply control circuit; 14: SVID interface; 15: telemetry register; 16: operation mode register; 17, 63: ADC; 18: voltage instruction value register; 19: power state instruction value register; 20: DAC digital step control unit; 21: phase clock generating unit; 22: DAC; 23: error amplifier; 24: differential amplifier; 25: CPU; 26: potential fixing unit; 27: system control unit; 52, 62: DSP; 30-1 to 30-3: voltage regulator; 31: PWM comparator; 32: latch circuit; 33: DC-DC converter; 151: PWM unit; 152: input unit; 153: output unit; 161: control unit; 187 to 189: dedicated calculation element for output voltage; 190: ALU; 196: high-side MOS transistor; 197: low-side MOS transistor; 198: MOS control unit.

The invention claimed is:

1. A controller for controlling a voltage regulator that supplies a power supply voltage to a first semiconductor device, comprising:

an input unit for receiving a monitor voltage for monitoring said power supply voltage supplied to said first semiconductor device;
a control unit for detecting that said power supply voltage is decreased to a target voltage by said monitor voltage in a discharge mode in which the power supply voltage of said first semiconductor device is decreased with said voltage regulator being in OFF state; and
an output unit for outputting a signal indicating that said target voltage has been reached, when said power supply voltage reaches said target voltage from a starting voltage obtained upon start of said discharge mode, wherein
said voltage regulator has a high-side transistor and a low-side transistor,
the controller has a normal mode in which said power supply voltage is maintained at a normal instruction voltage, which is a constant voltage, by controlling ON state and OFF state of said high-side transistor and said low-side transistor, and
when a difference between a first starting voltage, from which discharge is started in said discharge mode, and said target voltage is equal to a difference between a second starting voltage, from which the normal mode is started in said normal mode, and said normal instruction voltage, it takes a shorter time to reach said normal instruction voltage from said second starting voltage in said normal mode than a time taken to reach said target voltage from said first starting voltage in the discharge mode.

2. A controller for controlling a voltage regulator that supplies a power supply voltage to a first semiconductor device, comprising:

an input unit for receiving a monitor voltage for monitoring said power supply voltage supplied to said first semiconductor device;
a control unit for detecting that said power supply voltage is decreased to a target voltage by said monitor voltage in a discharge mode in which the power supply voltage of said first semiconductor device is decreased with said voltage regulator being in OFF state; and
an output unit for outputting a signal indicating that said target voltage has been reached, when said power supply voltage reaches said target voltage from a starting voltage obtained upon start of said discharge mode, wherein
said voltage regulator has a high-side transistor and a low-side transistor,
the controller has a normal mode in which said power supply voltage is maintained at a normal instruction voltage, which is a constant voltage, by controlling ON state and OFF state of said high-side transistor and said low-side transistor, and
when the signal indicating that said target voltage has been reached is output, the voltage applied to said first semiconductor device is controlled to correspond to an instruction voltage lower than said target voltage.

3. The controller according to claim 2, wherein a difference between said target voltage and said instruction voltage is smaller than a difference between said first starting voltage and said target voltage.

4. The controller according to claim 3, wherein said target voltage is stored in said controller and is able to be changed by a signal externally provided to said controller.

* * * * *